US009512879B2

(12) United States Patent
Nishioka et al.

(10) Patent No.: US 9,512,879 B2
(45) Date of Patent: Dec. 6, 2016

(54) TILTING PAD BEARING DEVICE

(71) Applicant: MITSUBISHI HITACHI POWER SYSTEMS, LTD., Kanagawa (JP)

(72) Inventors: Tadasuke Nishioka, Tokyo (JP); Yuki Sumi, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 0 days.

(21) Appl. No.: 14/939,236

(22) Filed: Nov. 12, 2015

(65) Prior Publication Data
US 2016/0069387 A1 Mar. 10, 2016

Related U.S. Application Data

(63) Continuation of application No. 14/763,930, filed as application No. PCT/JP2014/052059 on Jan. 30, 2014, now Pat. No. 9,366,287.

(30) Foreign Application Priority Data

Jan. 31, 2013 (JP) .................................. 2013-016421
Jul. 12, 2013 (JP) .................................. 2013-146668
Jul. 12, 2013 (JP) .................................. 2013-146669

(51) Int. Cl.
F16C 17/02 (2006.01)
F16C 32/06 (2006.01)
(Continued)

(52) U.S. Cl.
CPC ........... F16C 32/0659 (2013.01); F16C 17/03 (2013.01); F16C 32/064 (2013.01);
(Continued)

(58) Field of Classification Search
CPC ..... F16C 17/03; F16C 17/035; F16C 32/0659; F16C 33/1045; F16C 33/108; F16C 33/1065
(Continued)

(56) References Cited

U.S. PATENT DOCUMENTS 2,348,928 A * 5/1944 Sampatacos ............ F16C 17/03
29/898.054
3,784,266 A 1/1974 Parlevliet
(Continued)

FOREIGN PATENT DOCUMENTS

CN 87 2 05706 7/1988
CN 1054548 9/1991
(Continued)

OTHER PUBLICATIONS

International Search Report issued Apr. 8, 2014 in corresponding International Application No. PCT/JP2014/052059.
(Continued)

Primary Examiner — Phillip A Johnson
(74) Attorney, Agent, or Firm — Wenderoth, Lind & Ponack, L.L.P.

(57) ABSTRACT

An object is to provide a tilting-pad bearing device whereby it is possible to levitate a rotation shaft with a low supply-oil pressure. A tilting-pad bearing device includes a plurality of bearing pads disposed around a rotation shaft so as to support the rotation shaft rotatably, a support member interposed between the plurality of bearing pads and a bearing housing supporting the plurality of bearing pads, the support member supporting each of the plurality of bearing pads pivotably, and an oil-supply mechanism configured to supply a lubricant oil to at least one oil groove formed on a bearing surface of at least one of the plurality of bearing pads. The at least one oil groove is disposed inside and
(Continued)

outside a contact area of the bearing surface which is in contact with an outer circumferential surface of the rotation shaft when the rotation shaft is stopped.

11 Claims, 18 Drawing Sheets

(51) Int. Cl.
  *F16C 33/10* (2006.01)
  *F16C 17/03* (2006.01)
(52) U.S. Cl.
  CPC ...... *F16C 32/0644* (2013.01); *F16C 32/0655* (2013.01); *F16C 33/1045* (2013.01)
(58) Field of Classification Search
  USPC ........ 384/117, 286, 291, 292, 309, 311, 312
  See application file for complete search history.

(56) References Cited

U.S. PATENT DOCUMENTS

| | | | | |
|---|---|---|---|---|
| 3,891,281 | A * | 6/1975 | Jenness | F16C 17/03 384/100 |
| 3,985,405 | A * | 10/1976 | Okano | F16C 17/03 384/117 |
| 4,580,911 | A * | 4/1986 | Burkhard | F16C 17/03 384/309 |
| 4,746,230 | A * | 5/1988 | Jensen | F16C 17/03 384/311 |
| 5,000,584 | A | 3/1991 | Simmons | |
| 9,297,363 | B2 | 3/2016 | Guerenbourg et al. | |
| 2003/0142890 | A1 | 7/2003 | Miller | |
| 2004/0055825 | A1 | 3/2004 | Fuerst et al. | |
| 2006/0165326 | A1 * | 7/2006 | Light | F16C 32/0659 384/291 |
| 2009/0080820 | A1 * | 3/2009 | Matyscak | F16C 33/108 384/293 |
| 2012/0099993 | A1 | 4/2012 | Guerenbourg et al. | |
| 2013/0028731 | A1 * | 1/2013 | Mimura | F16C 17/03 415/229 |

FOREIGN PATENT DOCUMENTS

| | | | |
|---|---|---|---|
| CN | 201090607 | 7/2008 | |
| CN | 101641525 | 2/2010 | |
| DE | 2709048 A1 * | 9/1978 | ............. F16C 17/03 |
| FR | 2175404 | 10/1973 | |
| JP | 50-138243 | 11/1975 | |
| JP | 55-69317 | 5/1980 | |
| JP | 55-71821 | 5/1980 | |
| JP | 59-212520 | 12/1984 | |
| JP | 2-146961 | 12/1990 | |
| JP | 4-96621 | 8/1992 | |
| JP | 7-27132 | 1/1995 | |
| JP | 7-113422 | 5/1995 | |
| JP | 8-42560 | 2/1996 | |
| JP | 10-292817 | 11/1998 | |
| JP | 2001-124062 | 5/2001 | |
| JP | 2001-517288 | 10/2001 | |
| JP | 2004-301258 | 10/2004 | |
| JP | 2011-127772 | 6/2011 | |
| JP | 2012-532279 | 12/2012 | |
| JP | 2013057335 A * | 3/2013 | |
| JP | 2013-137100 | 7/2013 | |
| KR | 10-2012-0042962 | 5/2012 | |

OTHER PUBLICATIONS

Written Opinion of the International Searching Authority issued Aug. 13, 2015 in corresponding International Application No. PCT/JP2014/052059.
Extended European Search Report issued Feb. 22, 2016 in corresponding European application No. 14745639.6.
Extended European Search Report issued Feb. 15, 2016 in corresponding European divisional application No. 15188732.0.
Notice of Preliminary Rejection mailed Jul. 1, 2016 in corresponding Korean Application No. 10-2015-7022540 (with English translation).
Office Action mailed Sep. 9, 2016 in corresponding Japanese Application No. 2013-146668 (with English translation).
Notice of Allowance issued Sep. 8, 2016 in corresponding Korean Application No. 10-2015-7018155 (with English translation).
Notice of Allowance issued Sep. 8, 2016 in corresponding Korean Application No. 10-2015-7022536 (with English translation).
Notice of Allowance issued Sep. 8, 2016 in corresponding Korean Application No. 10-2015-7022540 (with English translation).
First Office Action issued Sep. 2, 2016 in corresponding Chinese Application No. 201480003228.4 (with English translation).

* cited by examiner

RELATED ART

FIG.17A
FIG.17B
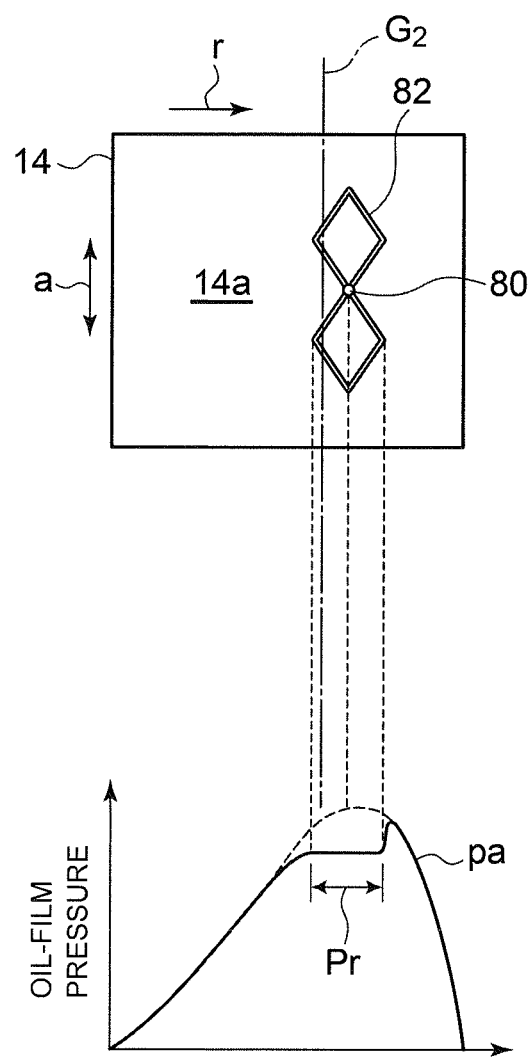
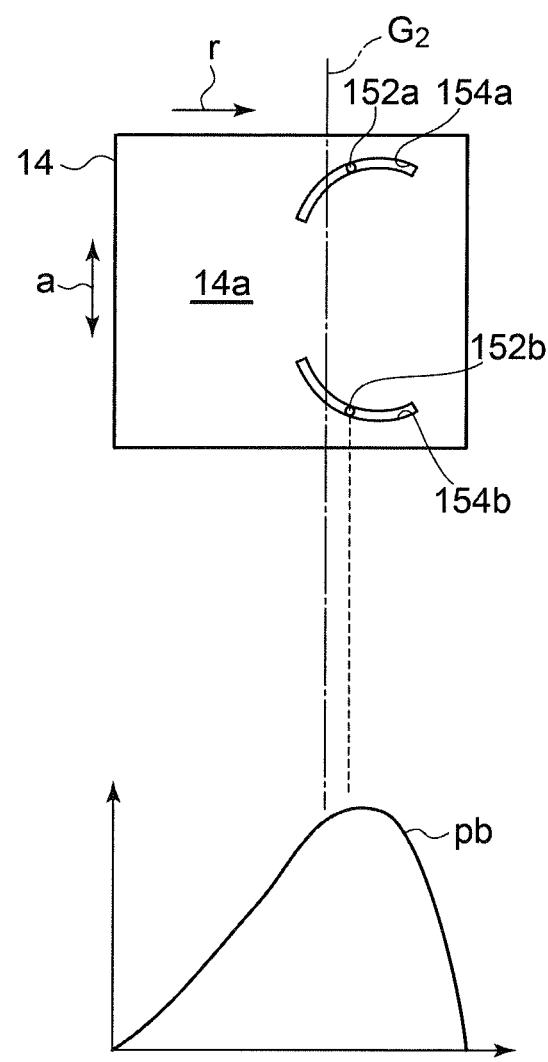

TILTING PAD BEARING DEVICE

TECHNICAL FIELD

The present invention relates to a tilting-pad bearing device which supports a rotation shaft of a large-sized rotary machine with a plurality of pivotable bearing pads, such as a slide bearing for a steam turbine.

BACKGROUND

In a large-sized rotary machine such as a turbine and a generator, a tilting-pad bearing device is used to support a rotation shaft stably. A tilting-pad bearing device is a kind of slide bearings, and includes a plurality of pivotable bearing pads (tilting pads) disposed around the rotation shaft inside a bearing housing. The bearing pads are pivotably supported by pivots disposed inside the bearing housing. When the rotation shaft rotates, lubricant oil is introduced into a gap between the outer circumferential surface of the rotation shaft and the bearing surface of the bearing pads to form an oil film of a wedge shape between the above surfaces, and thereby the tilting-pad bearing device supports the rotation shaft. For instance, Patent Document 1 discloses such a tilting-pad bearing device.

In such a tilting-pad bearing device, it is necessary to eliminate contact between the outer circumferential surface of the rotation shaft and the bearing surface of the tilting pad at the beginning of rotation or at low-speed rotation when an adequate load capability cannot be obtained from the wedge effect of the oil film, so as to prevent galling of the bearing surface. In this regard, a mechanism called a jacking oil pump (JOP mechanism) may be employed. For instance, in the JOP mechanism described in Patent Document 2, an oil-supply inlet is disposed on the bearing surface of the tilting pad, and high-pressure lubricant oil is supplied to the oil-supply inlet from a pump via an oil-supply channel to form an oil film on the bearing surface so that the rotation shaft is levitated by the oil film. Normally, oil grooves are formed on the bearing surface to distribute the lubricant oil over a broad region.

CITATION LIST

Patent Literature

Patent Document 1: JPS59-212520A
Patent Document 2: JPH02-146961U

SUMMARY

Problems to be Solved

The tilting-pad bearing device is configured such that the bearing pads are supported by pivots contacting the outer circumferential surfaces of the bearing pads so as to be pivotable. Thus, the bearing pads slightly deform due to the self-weight of the bearing pads or a load or the like applied to the bearing pads via the rotation shaft. Thus, when the rotation shaft stops, the bearing pads contact the rotation shaft in a contact area having a shape which depends on the deformation of the bearing pads. In a case where the bearing pads are point-supported by the pivots, for instance, the contact area between the bearing pads and the rotation shaft has a substantially ellipse shape.

Here, as a result of intensive researches of the present inventors, it was found that the levitation characteristic of the rotation shaft achieved by the JOP mechanism is affected by a relationship in the relative arrangement between: the contact area of each bearing pad and the rotation shaft at the time when the rotation shaft is stopped; and the oil grooves for introducing lubricant oil disposed on the bearing surface of the bearing pad. In other words, depending on the relationship in the relative arrangement between the contact area and the oil grooves, the supply hydraulic pressure to the JOP mechanism required to levitate the rotation shaft varies.

However, Patent Documents 1 and 2 do not disclose a relationship in the relative arrangement between the contact area and the oil grooves which enables levitation of the rotation shaft with the JOP mechanism even if the pressure of the supply oil to the JOP mechanism is low.

An object of at least some embodiments of one aspect of the present invention is to provide a tilting-pad bearing device whereby it is possible to levitate the rotation shaft with a low supply hydraulic pressure.

Further, an object of at least some embodiments of another aspect of the present invention is to provide a tilting-pad bearing device whereby it is possible to prevent contact between the rotation shaft and the bearing pad.

Solution to the Problems

A tilting-pad bearing device according to some embodiments of the present invention includes: a plurality of bearing pads disposed around a rotation shaft so as to support the rotation shaft rotatably; a support member interposed between the plurality of bearing pads and a bearing housing supporting the plurality of bearing pads, the support member supporting each of the plurality of bearing pads pivotably; and an oil-supply mechanism configured to supply a lubricant oil to at least one oil groove formed on a bearing surface of at least one of the plurality of bearing pads. The at least one oil groove is disposed inside and outside a contact area of the bearing surface which is in contact with an outer circumferential surface of the rotation shaft when the rotation shaft is stopped.

With the above tilting-pad bearing device, the oil grooves are disposed inside and outside the contact area of the bearing surface contacting the outer circumferential surface of the rotation shaft, and the lubricant oil is supplied to the oil grooves from the oil-supply mechanism. Thus, it is possible to distribute the lubricant oil to both inside and outside the contact area when the lubricant oil is supplied from the oil-supply mechanism via the oil grooves at the beginning of the rotation of the rotation shaft or at low-speed rotation of the rotation shaft. As a result, even if the supply hydraulic pressure to the oil-supply mechanism is relatively low, it is possible to levitate the rotation shaft effectively.

Here, the contact area is determined from the diameter of the rotation shaft (the curvature radius of the outer circumferential surface of the rotation shaft), the curvature radius of the bearing surface of the bearing pad, the material of the bearing pad, and the load or the like applied to the tilting-pad bearing device via the rotation shaft. The shape and position of the contact area may be obtained on a trial basis, or may be estimated by simulation. For instance, a sheet of carbonless copy paper may be interposed between the rotation shaft and the bearing pad, and a colored area of the sheet of carbonless copy paper may be determined as the contact area. Alternatively, the contact area may be estimated from the contact stress calculated by using the Hertz theory, or may be estimated using the FEM analysis.

Further, a tilting-pad bearing device according to at least some embodiments of another aspect of the present invention includes: a plurality of bearing pads disposed around a rotation shaft so as to support the rotation shaft rotatably; a support member interposed between the plurality of bearing pads and a bearing housing supporting the plurality of bearing pads, the support member supporting each of the plurality of bearing pads pivotably; and an oil-supply mechanism configured to supply a lubricant oil to at least one oil groove formed on a bearing surface of at least one of the plurality of bearing pads.

The support member is disposed so as to be offset from a middle position of the at least one bearing pad in a rotational direction of the rotation shaft, toward an upstream side or a downstream side in the rotational direction of the rotation shaft. A weighted mean position of the at least one oil groove representing a mean position of a respective center position of the at least one oil groove in a circumferential direction of the rotation shaft weighted by a respective opening area of the at least one oil groove is offset from an arrangement position of the support member, in an offset direction of the support member based on the middle position.

With the above tilting-pad bearing device, the weighted mean position of the oil groove representing the mean position of the center positions $x_i$ of the respective oil grooves weighted by the opening areas $S_i$ of the oil grooves is offset in an offset direction of the support member from the arrangement position of the support member. Thus, even if the support member is offset, it is possible to restrict the gap between the outer circumferential surface of the rotation shaft and an end of the bearing pad at the offset side from being smaller than the gap between the outer circumferential surface of the rotation shaft and an end of the bearing pad at the opposite side of the offset direction. In this way, it is possible to restrict inclination of the rotation shaft, and to prevent the rotation shaft from contacting the bearing pad, at the beginning of rotation of the rotation shaft or at low-speed rotation of the rotation shaft.

In one embodiment, the at least one oil groove extends continuously from inside to outside of the contact area.

As described above, providing the at least one oil groove extending continuously form inside to outside of the contact area makes it possible to reduce the number of the oil grooves while maintaining the levitation performance of the rotation shaft achieved by the oil grooves.

In another embodiment, the at least one oil groove includes an inner oil groove disposed inside the contact area and an outer oil groove disposed outside the contact area separately from the inner oil groove.

As described above, providing the inner oil groove disposed inside the contact area and the outer oil groove disposed outside the contact area makes it possible to improve the flexibility of the position and shape of each oil groove while maintaining the levitation performance of the rotation shaft achieved by the oil grooves.

In some embodiments, each of the at least one oil groove is disposed along a constant-pressure line passing through positions having same pressure of an oil film formed between the bearing surface and the outer circumferential surface of the rotation shaft when the rotation shaft is rotating.

Each oil groove is formed by a single communicating space. Thus, the pressure is the same at any position in each of the oil grooves. Accordingly, if the oil grooves were formed over different constant-pressure lines, the pressures in the respective oil grooves could be averaged upon rotation of the rotation shaft, hindering the function as a hydrodynamic bearing. In view of this, as in the above embodiment, each oil groove is disposed along a constant-pressure line, which makes it possible to maintain the pressures inside the oil grooves at the respective constant-pressure line positions, and to maintain a good function as a hydrodynamic bearing.

In one embodiment, the at least one oil groove comprises at least one first oil groove disposed along a first constant-pressure line passing through positions where the pressure of the oil film is a first pressure, and at least one second oil groove disposed along a second constant-pressure line passing through positions where the pressure of the oil film is a second pressure which is different from the first pressure. The oil-supply mechanism includes a first oil-supply channel communicating with the at least one first oil groove, and a second oil-supply channel communicating with the at least one second oil groove. The first oil-supply channel and the second oil-supply channel are separate systems capable of maintaining pressures different from each other at least when the rotation shaft is rotating.

According to the above embodiment, the first oil-supply passage communicating with the first oil groove and the second oil-supply passage communicating with the second oil groove are provided as separate systems so as to be capable of maintaining pressures different from each other at least when the rotation shaft rotates. In this way, it is possible to prevent the pressures of the first oil groove and the second oil groove disposed along different constant-pressure lines (the first and second constant-pressure lines) from being averaged when the rotation shaft is rotating at a rated rotation speed, and to maintain a good function as a hydrodynamic bearing.

In one embodiment, the at least one first oil groove disposed along the first constant-pressure line comprises a plurality of first oil grooves communicating with each other via the first oil-supply channel.

As described above, adopting a configuration in which the oil-supply channels communicate with each other for the plurality of the first oil grooves disposed along the same constant-pressure line makes it possible to simplify the configuration of the oil-supply mechanism such as the oil-supply channels and the valve.

In some embodiments, the tilting-pad bearing device further includes: a first valve for adjusting an amount of the lubricant oil supplied to the at least one first oil groove, the first valve being disposed in the first oil channel; and a second valve for adjusting an amount of the lubricant oil supplied to the at least one second oil groove, the second valve being disposed in the second oil channel.

When the JOP mechanism is operated such as at the beginning of rotation of the rotation shaft or at low-speed rotation of the rotation shaft, it is possible to adjust the amount of lubricant oil supplied to each oil groove by adjusting the opening degree of each valve. On the other hand, when the lubricant oil is not supplied to the bearing surface such as when the rotation shaft is rotating at a rated rotation speed, it is possible to prevent leakage of the lubricant oil from the oil channels by shutting off the oil channels with the respective valves. As a result, it is possible to maintain the oil-film pressure of the bearing surface suitably.

In some embodiments, the support member is disposed so as to be offset from a middle position of the at least one bearing pad in a rotational direction of the rotation shaft, toward an upstream side or a downstream side in the rotational direction of the rotation shaft. A weighted mean position of the at least one oil groove representing a mean position of a respective center position of the at least one oil groove in a circumferential direction of the rotation shaft weighted by a respective opening area of the at least one oil groove is offset from an arrangement position of the support member, in an offset direction of the support member based on the middle position.

A moment about the support point of the bearing pad supported by the support member is applied to the bearing pad of the tilting-pad bearing device, in accordance with the distribution of the oil-film pressure formed between the rotation shaft and the bearing pad during operation of the JOP mechanism (i.e., while the lubricant oil is supplied) at the beginning of rotation of the rotation shaft or at low-speed rotation of the rotation shaft. This moment is obtained by adding up local moments of all positions on the bearing surface, each local moment being a product of the oil-film pressure at a certain position on the bearing surface and a distance between the certain position and the support point. The local moments have opposite signs at either side of the support point of the bearing pad supported by the support member. Thus, the direction of the net moment corresponding to the distribution of the oil-film pressure formed between the rotation shaft and the bearing pad is determined depending on the magnitude relationship of the absolute value of the moment at either side of the support point of the bearing pad supported by the support member. Here, the contribution of each oil groove to the local moment is represented by a product $x_iS_i$ of the center position $x_i$ (i=1, 2) of each oil groove and the opening area $S_i$ (i=1, 2) of the oil groove affecting the magnitude of the oil-film pressure formed by the oil groove. Thus, the direction of the net moment corresponding to the distribution of the oil-film pressure is basically determined by the sum $\Sigma x_iS_i$ (i=1, 2) of contribution to the local moment in each oil groove. In other words, the direction of the net moment corresponding to the distribution of the oil-film pressure is determined depending on the arrangement relationship between the position of the support member and a value obtained by dividing the sum $\Sigma x_iS_i$ by the sum $\Sigma S_i$ of the opening areas of all oil grooves. The value here is the weighted mean position $x_A$ of the oil groove representing the mean position of the center positions $x_i$ of the respective oil grooves weighted by the opening areas $S_i$ of the oil grooves.

With the above tilting-pad bearing device, the weighted mean position of the oil grooves representing the mean position of the center positions of the respective oil grooves weighted by the opening areas of the oil grooves is offset in an offset direction of the support member from the arrangement position of the support member. Thus, even if the support member is offset, it is possible to balance the moment applied to the upstream side and the downstream side of the rotation shaft in the rotational direction with reference to the support member. In this way, it is possible to restrict inclination of the rotation shaft, and to prevent the rotation shaft from contacting the bearing pad, at the beginning of rotation of the rotation shaft or at low-speed rotation of the rotation shaft.

In one embodiment, the support member is disposed on the downstream side, in the rotational direction of the rotation shaft, of the middle position of the bearing pad in the circumferential direction of the rotation shaft. The weighted mean position of the at least one oil groove is offset toward the downstream side in the rotational direction of the rotation shaft from the arrangement position of the support member.

In some embodiments, a plurality of oil-supply inlets which is supplied with the lubricant oil from the oil-supply mechanism is disposed on the bearing surface so as to be arranged in a line in an axial direction of the rotation shaft, each of the plurality of oil-supply inlets communicating with corresponding one of the at least one oil groove formed independently from one another.

In this way, even if there is a partial contact in the axial direction of the rotation shaft, it is possible to remedy the partial contact by adjusting the oil-film pressure of each oil groove by adjusting the amount of lubricant oil supplied to each oil groove.

In some embodiments, the at least one oil groove is disposed within a region in which an oil-film pressure due to a wedge-shaped oil film formed on the bearing surface is uniform when the rotation shaft is rotating.

If one continuous oil groove is formed over regions having different oil-film pressures formed between the rotation shaft and the bearing pad, the oil-film pressure of the oil groove decreases following the lower one of the oil-film pressures. In contrast, if one oil groove is formed in a region having the same oil-film pressure like the above embodiment, it is possible to prevent such a decrease in the oil-film pressure.

In some embodiments, when the rotation shaft is rotating, a constant-pressure region in which an oil-film pressure due to a wedge-shaped oil film formed on the bearing surface is uniform is formed such that a maximum oil-film pressure region is at a center and a region having a gradually decreasing oil-film pressure spreads outwardly from the maximum oil-film pressure region in a concentric fashion. The at least one oil groove is disposed along one constant-pressure line.

As described above, providing the oil groove along the constant-pressure line in the distribution of the oil-film pressure formed during rotation of the rotation shaft, which is a distribution in which a region with a gradually decreasing oil-film pressure is spreading in a concentric fashion outwardly from the maximum oil-film pressure region at the center, makes it possible to maintain a good function as a hydrodynamic bearing.

In some embodiments, a gap between the rotation shaft and an upstream end of the bearing pad in the rotational direction is distributed in a range equivalent to a gap between the rotation shaft and a downstream end of the bearing pad in the rotational direction, due to an oil-film pressure generated between the outer circumferential surface of the rotation shaft and the bearing surface when the rotation shaft is rotating.

Advantageous Effects

According to some embodiments of the present invention, the oil grooves are disposed inside and outside the contact area of the bearing surface contacting the outer circumferential surface of the rotation shaft, and the lubricant oil is supplied to the oil grooves from the oil-supply mechanism. Thus, it is possible to distribute the lubricant oil to both inside and outside the contact area when the lubricant oil is supplied from the oil-supply mechanism via the oil grooves at the beginning of the rotation of the rotation shaft or at low-speed rotation of the rotation shaft. As a result, even if the supply hydraulic pressure to the oil-supply mechanism is relatively low, it is possible to levitate the rotation shaft effectively.

BRIEF DESCRIPTION OF DRAWINGS

FIG. 17A is a diagram of pressure distribution of an oil film in the oil groove according to the fourth embodiment, and FIG. 17B is a diagram of pressure distribution of an oil film in the oil groove according to the sixth embodiment.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not limitative of the scope of the present invention.

First Embodiment

Figure 1:
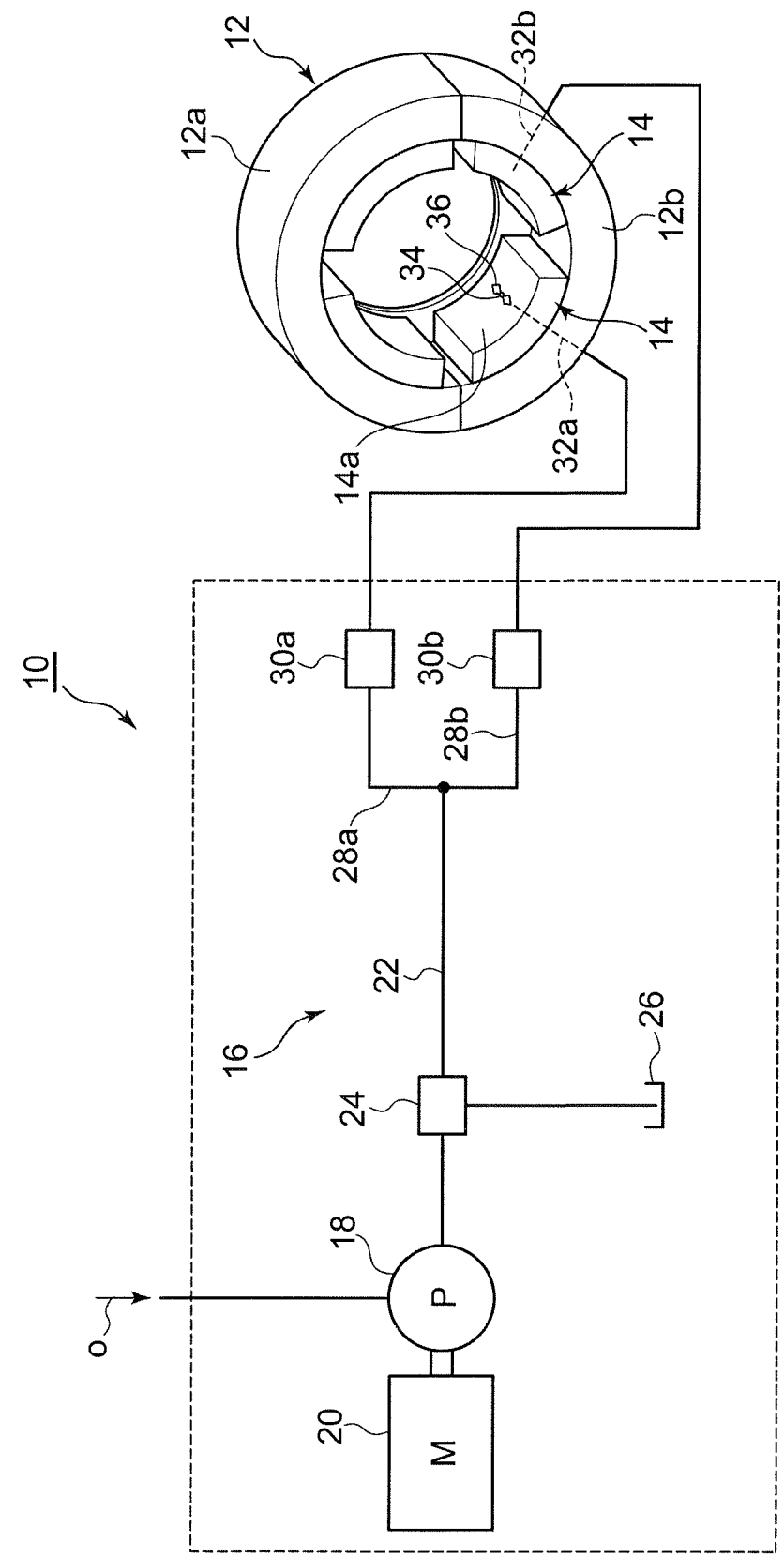
FIG. 1 is an overall configuration diagram of a bearing device according to the first embodiment of the present invention.

With reference to FIG. 1, the overall schematic configuration of a tilting-pad bearing device 10 according to the first embodiment of the present invention will be described. FIG. 1 is an overall configuration diagram of a tilting-pad bearing device according to the first embodiment of the present invention.

In some embodiments, a bearing housing 12 illustrated in FIG. 1 is a bearing housing of a halved type, which includes semicircle-shaped housing segments 12a and 12b. The housing segments 12a and 12b are joined to each other by coupling units such as bolts while the coupling surfaces of the housing segments 12a and 12b are in contact. A plurality of (four in FIG. 1) bearing pads 14 is disposed along the inner circumferential surface of the bearing housing 12, and the inner circumferential surface of each bearing pad 14 forms a bearing surface 14a. Inside the bearing surfaces 14a, a rotation shaft 15 (see FIG. 2) of a large-sized rotary machine such as a turbine and a generator is disposed. An oil-supply inlet 34 is disposed, and an oil groove 36 communicating to the oil-supply inlet 34 is engraved, on the bearing surface 14a of at least one of the bearing pads 14 among the plurality of bearing pads 14, 14, and so on. The bearing pad 14 with the oil-supply inlet 34 and the oil groove 36 may be at least a bearing pad 14 disposed at the lower part in the circumferential direction of the rotation shaft 15 of the plurality of bearing pads 14, 14, and so on disposed around the rotation shaft 15. Specifically, the supply-oil inlet 34 and the oil groove 36 may be formed on the bearing pad 14 disposed at a position that supports the self-weight of the rotation shaft 15 when the rotation shaft 15 is stopped. It will be understood that the oil-supply inlet 34 and the oil groove 36 may be formed on the bearing pad 14 disposed at the upper part in the circumferential direction of the rotation shaft 15.

Now, the configuration of an oil-supply mechanism 16 that supplies lubricant oil to the oil-supply inlet 34 will be described. A pump 18 is driven by a motor 20 so as to supply high-pressure lubricant oil "o" to an oil-supply line 22 from an oil tank (not illustrated). A relief valve 24 is disposed in an oil channel 22, so that a part of the lubricant oil flowing through the oil channel 22 is emitted into a tank 26 to reduce the pressure of the lubricant oil "o" to a tolerance or less, when the pressure of the lubricant oil "o" exceeds the tolerance. The oil-supply line 22 branches into branch channels 28a and 28b at the downstream side. The branch channels 28a and 28b respectively include valves (flow-rate adjustment valves) 30a and 30b. The branch channels 28a and 28b communicate with the oil-supply inlet 34 formed on each bearing pad 14 via oil-supply holes 32a and 32b formed through the housing segments 12b and the bearing pads 14.

Figure 2:
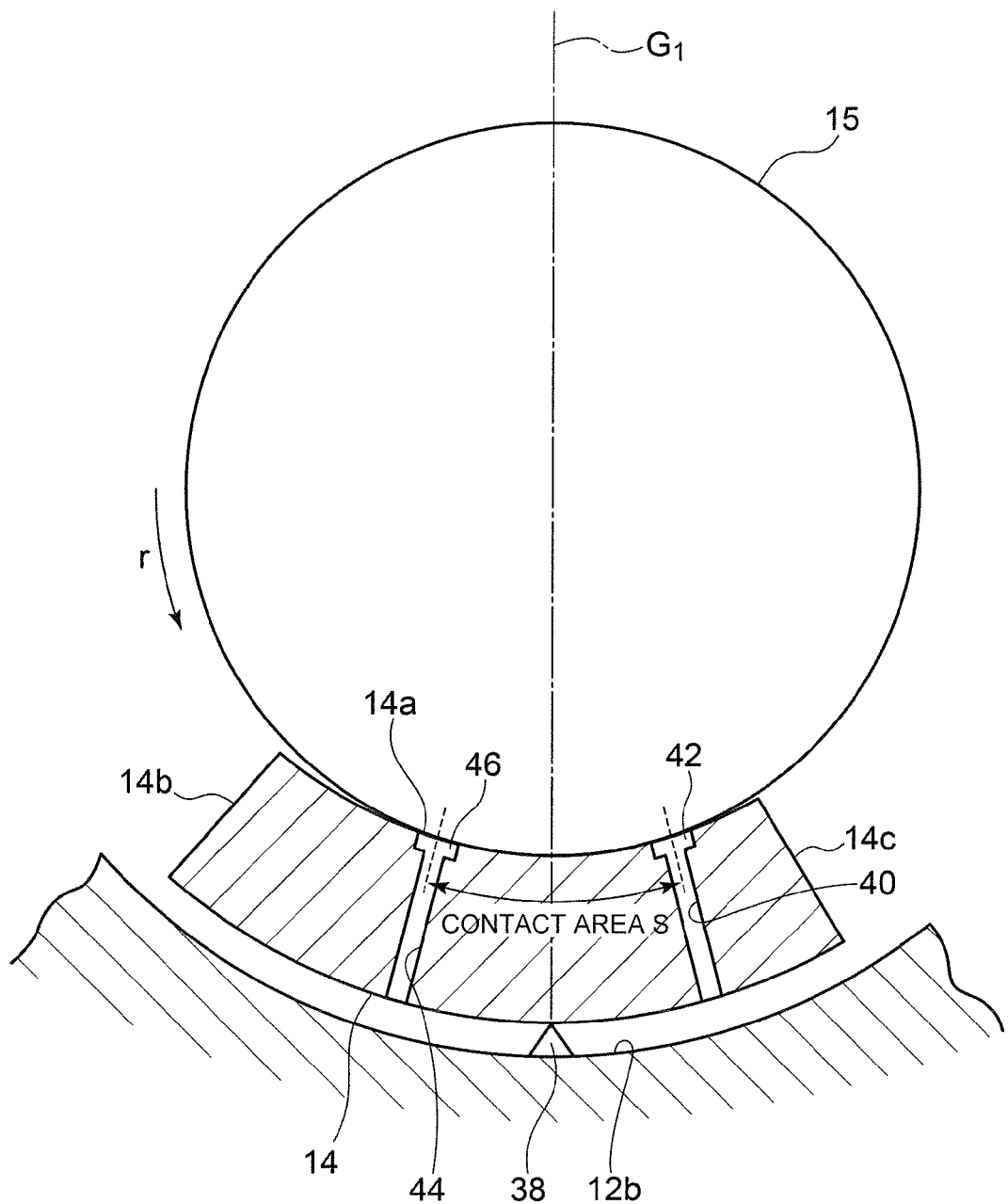
FIG. 2 is a cross-sectional view of a bearing pad according to the first embodiment.
Figure 3:
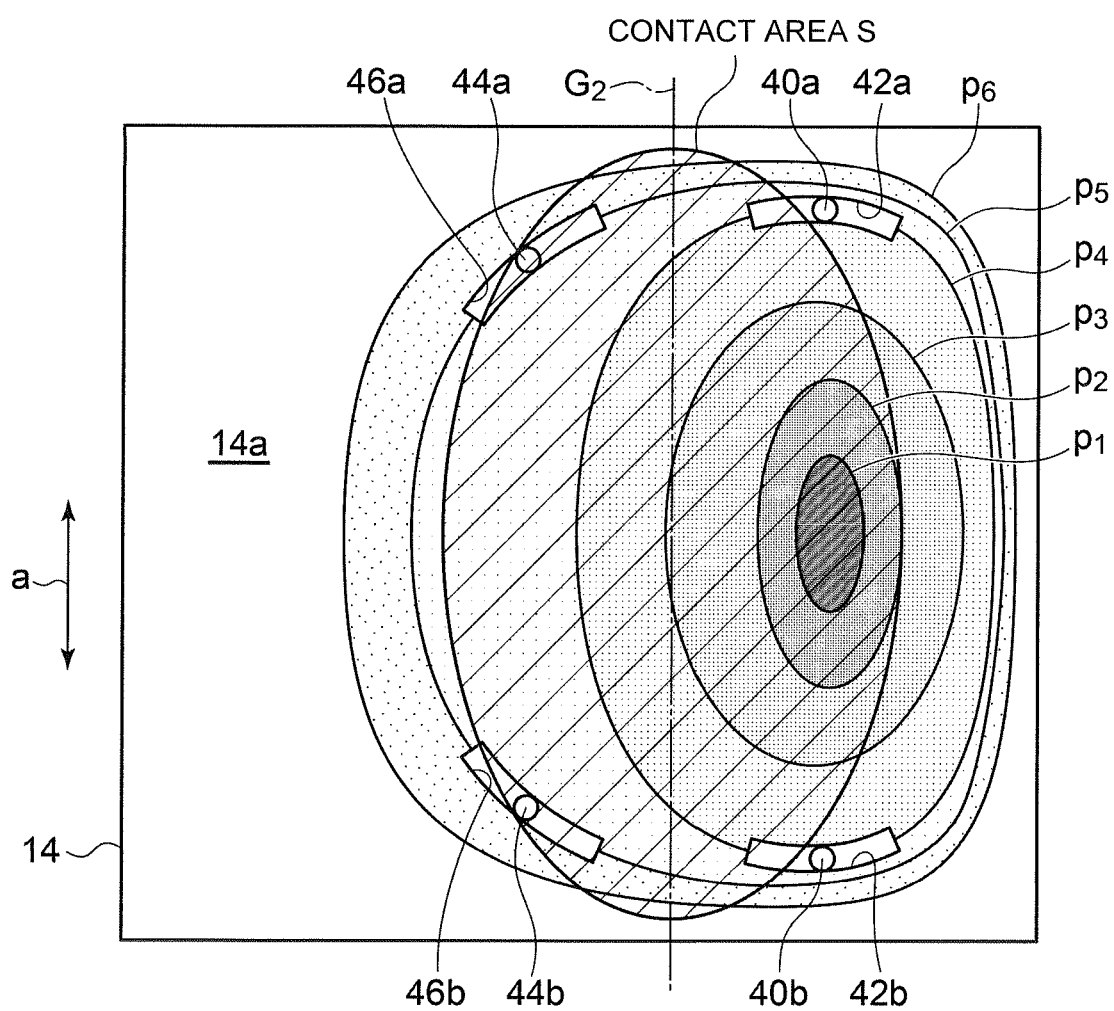
FIG. 3 is a developed view of a bearing surface of a bearing pad according to the first embodiment.

Next, with reference to FIGS. 2 and 3, the specific configuration of each part of the tilting-pad bearing device 10 will be described. FIG. 2 is a cross-sectional view of a bearing pad according to the first embodiment of the present invention. FIG. 3 is a developed view of a bearing surface of a bearing pad according to the first embodiment of the present invention. Specifically, FIG. 3 is a planar developed view of a bearing pad 14 having a curvature.

In the following embodiment, described as an example is a tilting-pad bearing device 10 having a configuration in which the bearing pads 14 are point-supported by pivots 38.

In FIG. 2, $G_1$ is a straight line that passes through the center of the rotation shaft 15 and a support point of one of the pivots 38. The arrow "r" in FIG. 2 is the rotational direction of the rotation shaft 15. In FIG. 3, $G_2$ is a straight line that passes through a support point of the bearing pad 14 supported by the pivot 38 and that is parallel to the axis of the rotation shaft 15. The arrow "a" represents the axial direction of the rotation shaft 15.

In some embodiments, the bearing pad 14 illustrated in FIGS. 2 and 3 is point-supported so as to be pivotable by the pivot 38 disposed on the inner circumferential surface of the housing segment 12b. While the pivot 38 is normally disposed in the vicinity of the center of the bearing pad 14, the pivot 38 may be disposed offset toward the upstream side or the downstream side with respect to the rotational direction from the middle position of the bearing pad 14 in the rotational direction of the rotation shaft 15. In FIG. 2, the leading edge 14*b* of the bearing pad 14 in the rotational direction is disposed at the upstream side, while the trailing edge 14*c* of the bearing pad 14 in the rotational direction is disposed at the downstream side, with respect to the rotational direction of the rotation shaft 15.

In one embodiment, in FIGS. 2 and 3, the straight line $G_2$ passing through the pivot 38 is disposed offset toward the downstream side in the rotational direction of the rotation shaft 15, from the middle position C (see FIG. 13) of the bearing pad 14 in the rotational direction of the rotation shaft 15. As described above, in a case where the tilting-pad bearing device 10 functions as a hydrodynamic bearing such as when the rotation shaft 15 is rotating at a rated rotation speed, with the pivot 38 being disposed at the downstream side in the rotational direction of the rotation shaft 15 with respect to the middle position of the bearing pad 14 in the circumferential direction of the rotation shaft 15, a gap increases between the bearing surface 14*a* of the leading edge 14*b* of the bearing pad 14 and the outer circumferential surface of the rotation shaft 15. As a result, the amount of lubricant oil introduced onto the bearing surface 14*a* increases, which makes it possible to improve lubricating performance between the bearing pad 14 and the rotation shaft 15.

In some embodiments, the bearing surface 14*a* of the bearing pad 14 includes four oil-supply inlets 40 (40*a*, 40*b*), 44 (44*a*, 44*b*), and oil grooves 42 (42*a*, 42*b*), 46 (46*a*, 46*b*) respectively communicating with the oil-supply inlets 40, 44.

In the tilting-pad bearing device 10 having the above configuration, the bearing pad 14 is supported by the pivot 38 contacting the outer circumferential surface of the bearing pad 14 so that the bearing pad 14 is pivotable. Thus, the bearing pad 14 slightly deforms due to the self-weight of the bearing pad 14 or the load or the like applied to the bearing pad 14 via the rotation shaft 15. Thus, when the rotation shaft 15 is stopped, the bearing pad 14 and the rotation shaft 15 contact each other in a contact area S that has a shape depending on the deformation of the bearing pad 14. For instance, in a case where the bearing pad 14 is point-supported by the pivot 38 as illustrated in FIG. 2, the contact area S between the bearing pad 14 and the rotation shaft 15 has a substantially ellipse shape as illustrated in FIG. 3.

In some embodiments, oil grooves 42, 46 are disposed inside and outside the contact area S. The contact area S is determined from the diameter of the rotation shaft (the curvature radius of the outer circumferential surface of the rotation shaft), the curvature radius of the bearing surface 14*a* of the bearing pad 14, the material of the bearing pad 14, and the load or the like applied to the tilting-pad bearing device 10 via the rotation shaft 15. The shape and position of the contact area S may be obtained on a trial basis, or may be estimated by simulation. For instance, a sheet of carbonless copy paper may be interposed between the rotation shaft 15 and the bearing pad 14, and a colored area of the sheet of carbonless copy paper may be determined as the contact area S. Alternatively, the contact area S may be estimated from the contact stress calculated by using the Hertz theory, or the contact area S may be estimated using the FEM analysis.

Figure 4:
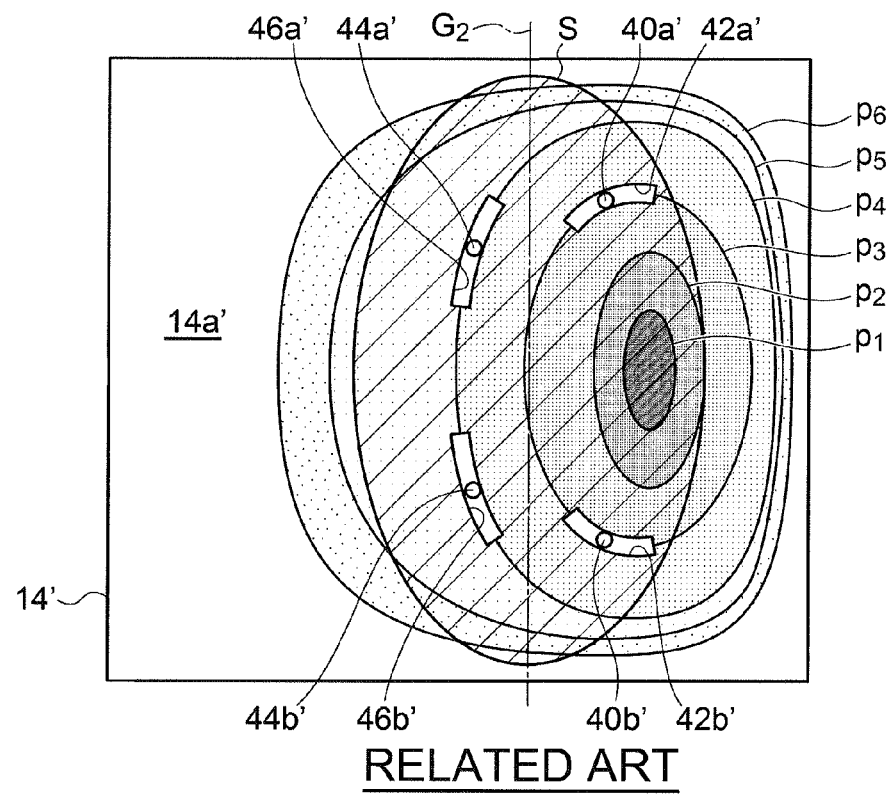
FIG. 4 is a developed view of a bearing surface of a bearing pad of a comparative example, where oil grooves are disposed only inside a contact area.
Figure 5:
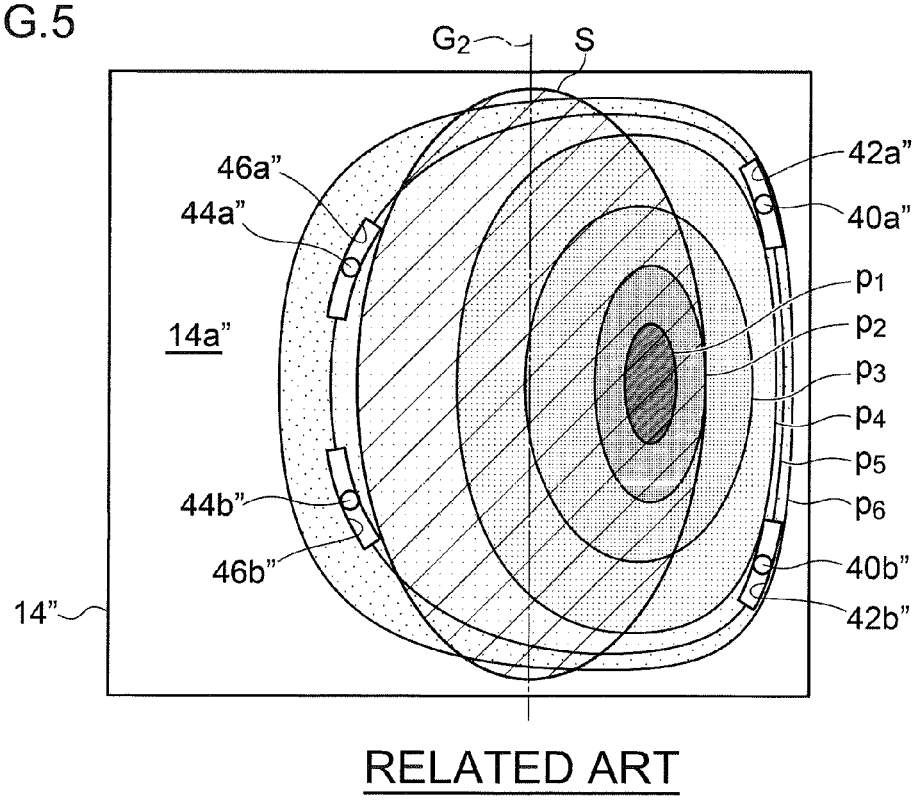
FIG. 5 is a developed view of a bearing surface of a bearing pad of another comparative example, where oil grooves are disposed only outside a contact area.
Figure 6A:
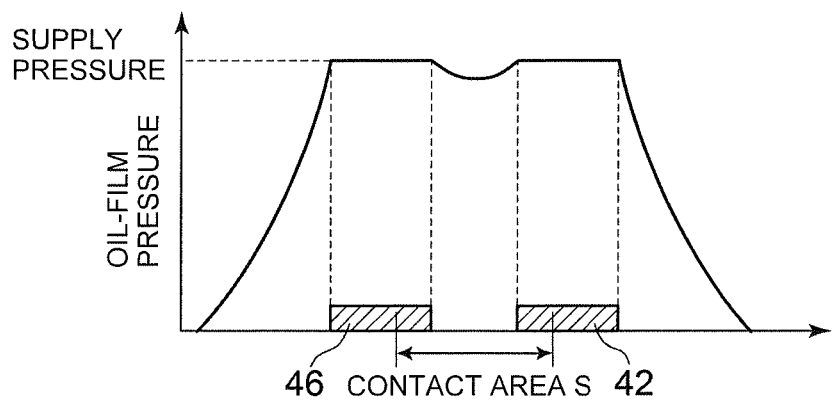
FIGS. 6A to 6C are each a graph of a relationship between a contact area and an oil-film pressure.
Figure 6B:
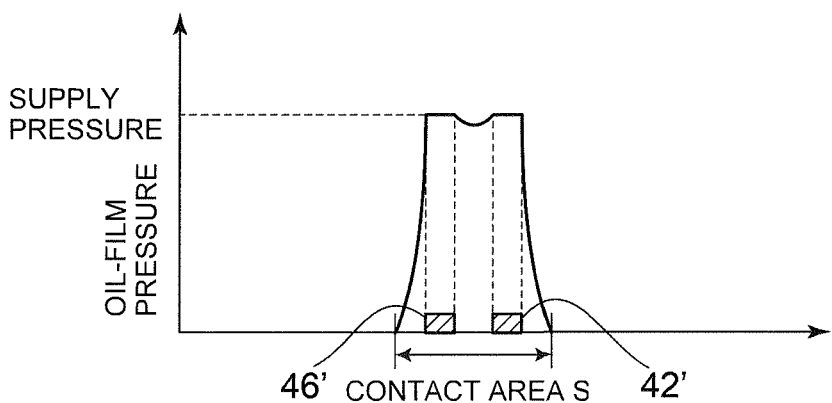

Now, with reference to FIG. 6, described below is the characteristics of the oil-film pressure compared between: the bearing pad 14 according to the first embodiment illustrated in FIGS. 2 and 3; and the bearing pads 14', 14" according to the comparison example illustrated in FIGS. 4 and 5. FIG. 4 is a developed view of a bearing surface of a bearing pad of a comparative example. FIG. 5 is a developed view of a bearing surface of a bearing pad of another comparative example, where oil grooves are disposed only outside the contact area. FIGS. 6A to 6C are each a graph of a relationship between a contact area and an oil-film pressure. FIG. 6A is a graph of the characteristics of an oil-film pressure of the bearing pad 14 corresponding to the first embodiment (FIG. 3). FIG. 6B is a graph of the characteristics of an oil-film pressure of the bearing pad 14' corresponding to a comparative example (FIG. 4). FIG. 6B is a graph of the characteristics of an oil-film pressure of the bearing pad 14' corresponding to another comparative example (FIG. 5).

For the bearing pad 14' illustrated in FIG. 4, there is no oil groove outside the contact area S, and the oil grooves 42' (42*a*', 42*b*'), 46' (46*a*', 46*b*') are disposed only inside the contact area S. In contrast, for the bearing pad 14" illustrated in FIG. 5, there is no oil groove outside the contact area S, and the oil grooves 42" (42*a*", 42*b*"), 46" (46*a*", 46*b*") are disposed only inside the contact area S.

As illustrated in FIGS. 4 and 6B, in a case where the oil grooves 42', 46' for introducing the lubricant oil are formed inside the contact area S, the gap between the bearing pad 14' and the rotation shaft 15 increases rapidly at a boundary from inside to outside the contact area S. Thus, the oil-film pressure due to the lubricant oil supplied to the gap via the oil grooves 42*a*', 42*b*', 46*a*', 46*b*' in the contact area S decreases considerably outside the contact area S due to the rapid increase in the volume of the gap, although the oil-film pressure is maintained to be high inside the contact area S. Thus, it is difficult to distribute the lubricant oil so as to form a substantially-uniform oil-film pressure over the entire bearing surface of the bearing pad 14'. The oil-film pressure may become insufficient especially outside the contact area S.

Figure 6C:
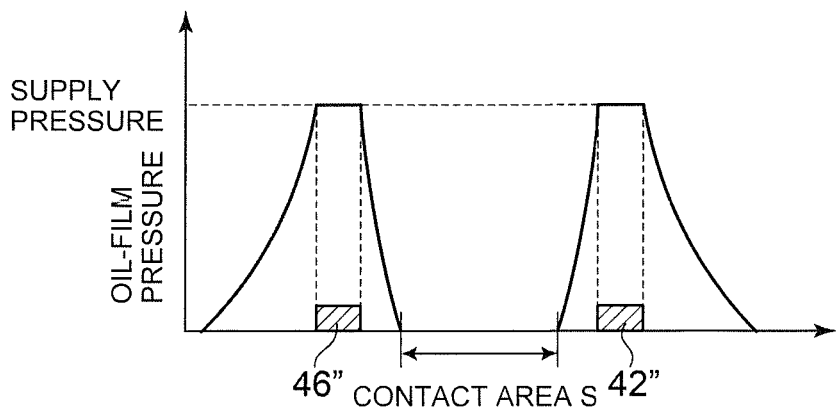

As illustrated in FIGS. 5 and 6C, in a case where the oil grooves 42", 46" are formed outside the contact area S, the gap between the bearing pad 14" and the rotation shaft 15 rapidly decreases at a boundary from outside to inside the contact area S. Thus, the lubricant oil may not be supplied sufficiently into contact area S, and the oil-film pressure may become insufficient inside the contact area S.

As described above, in the case of the bearing pads 14', 14" in the comparison examples, there is a risk that lubricant oil is not distributed sufficiently over the bearing surfaces 14*a*', 14*a*" of the bearing pads 14', 14", and the rotation shaft 15 does not levitate smoothly when the JOP mechanism is started to rotate the rotation shaft 15.

In contrast, in the present embodiment, as illustrated in FIGS. 3 and 6A, the oil grooves 42, 46 are disposed inside and outside the contact area S, which makes it possible to distribute the lubricant oil to both inside and outside the contact area S when the lubricant oil is supplied from the oil-supply mechanism 16 via the oil grooves 42, 46 at the beginning of the rotation of the rotation shaft 15 or at low-speed rotation of the rotation shaft 15. As a result, even when the supply hydraulic pressure to the oil-supply mechanism 16 is relatively low, it is possible to levitate the rotation shaft 15 effectively.

Further, in one embodiment, the at least one oil groove 42, 46 may extend continuously from inside to outside the contact area S. That is, each oil groove 42, 46 may extend so as to cross the boundary of the contact area S. Providing the at least one oil groove 42, 46 extending continuously form inside to outside of the contact area S as described above makes it possible to reduce the number of the oil grooves 42, 46 while maintaining the levitation performance of the rotation shaft 15 achieved by the oil grooves 42, 46. In the example illustrated in FIG. 3, all of the oil grooves 42, 46 are disposed so as to extend continuously from inside to outside the contact area S.

Further, in another embodiment that is not illustrated in the drawings, the at least one oil groove may include an inner oil groove disposed inside the contact area S and an outer oil groove disposed outside the contact area S separately from the inner oil groove. Providing the inner oil groove disposed inside the contact area S and the outer oil groove disposed outside the contact area S makes it possible to improve the flexibility of the installation position and shape of each oil groove while maintaining the levitation performance of the rotation shaft 15 achieved by the oil grooves.

Further, in some embodiments, each of the at least one oil groove 42, 44 may be disposed along a constant-pressure line that passes through positions having the same pressure of an oil film formed between the bearing surface 14*a* and the outer circumferential surface of the rotation shaft 15 when the rotation shaft 15 rotates.

When the rotation shaft 15 rotates at a high speed, supply of the lubricant oil to the oil-supply inlets 40, 44 disposed on the bearing surface 14*a* of the bearing pad 14 is stopped. At this time, the lubricant oil forms an oil-film pressure while rotating along with the rotation shaft 15, and the distribution of the oil-film pressure (see FIG. 3) is formed by the oil-film pressure. In FIG. 3, the lines p1 to p6 are constant-pressure lines of an oil film having a wedge shape formed from rotation of the shaft, where an interior region of the constant-pressure line p1 disposed at the innermost has the maximum oil-film pressure, the oil-film pressure decreasing sequentially toward the outside. As illustrated in the drawing, the distribution has an ellipse shape centered at the maximum oil-film pressure region (the inner region of p1) and constant-pressure regions spread in a concentric fashion. Here, a constant-pressure line is a line passing through positions having the same pressure of the oil film formed between the bearing surface 14*a* and the outer circumferential surface of the rotation shaft 15 when the rotation shaft 15 rotates.

In one embodiment, the oil-supply inlets 40 (40*a*, 40*b*) illustrated in FIG. 3 are all disposed on the constant-pressure line p4. Further, the oil grooves 42 (42*a*, 42*b*) communicating with the oil-supply inlets 40 are all disposed along the constant-pressure line p4. Similarly, the oil grooves 46 (46*a*, 46*b*) communicating with the oil-supply inlets 44 (44*a*, 44*b*) are disposed along the constant pressure line p5. The oil grooves 42 are independently provided from the oil grooves 46.

Each oil groove 42, 44 is formed by a single communicating space. Thus, the pressure is the same at any position in each of the oil grooves 42, 44. Accordingly, if the oil grooves 42, 44 were formed over different constant-pressure lines, the pressures in the respective oil grooves 42, 44 could be averaged upon rotation of the rotation shaft 15, hindering the function as a hydrodynamic bearing. In view of this, as in the above embodiment, the oil grooves 42, 44 are respectively disposed along the constant-pressure line p4, p5, which makes it possible to maintain the pressures inside the oil grooves 42, 44 at the respective constant-pressure line positions, and to maintain a good function as a hydrodynamic bearing.

Figure 7:
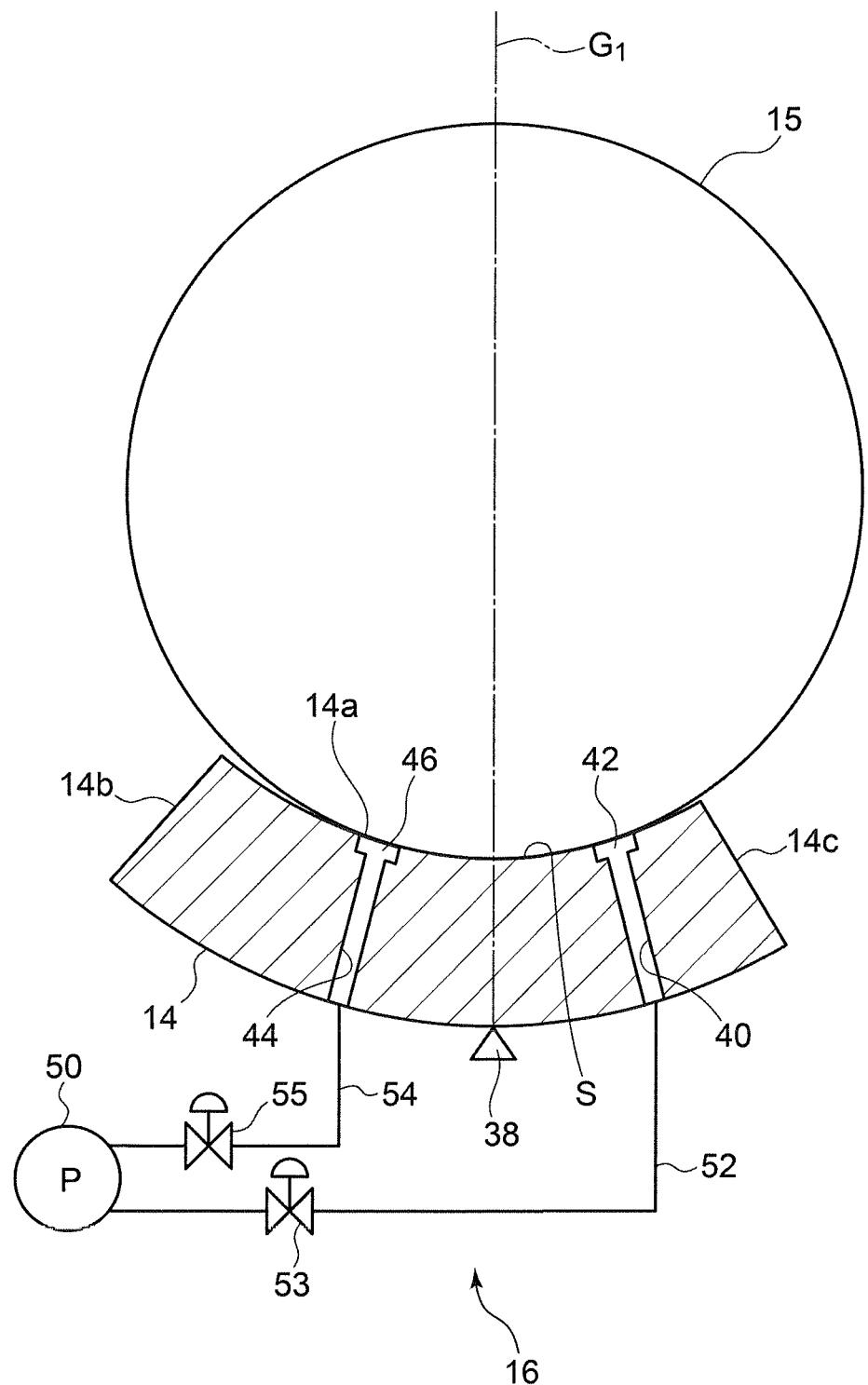
FIG. 7 is a configuration diagram of an example of an oil-supply mechanism of the bearing device according to the first embodiment.

Further, in one embodiment, as illustrated in FIG. 7, oil-supply channels 52, 54 which supply lubricant oil to the oil grooves 42 and the oil grooves 44 are provided as a separate system so as to be capable of maintaining different pressures from one another at least when the rotation shaft 15 rotates.

The oil-supply mechanism 16 illustrated in FIG. 7 includes the first oil-supply inlet 40, the first oil groove 42, the second oil-supply inlet 44, the second oil groove 46, the first oil-supply channel 52, the second oil-supply channel 54, the first valve 53, the second valve 55, and the pump 50.

The first oil groove 42 and the second oil groove 46 are disposed along constant-pressure lines representing different oil-film pressures. The first oil-supply channel 52 and the second oil-supply channel 54 are provided as separate systems so as to be capable of maintaining different pressures from one another at least when the rotation shaft 15 rotates. The first oil-supply channel 52 and the second oil-supply channel 54 are connected to the pump 50 so as to be supplied with the lubricant oil by the pump 50. The first valve 53 is disposed between the first oil-supply channel 52 and the pump 50, and the second valve 55 is disposed between the second oil-supply channel 54 and the pump 50, so that the amount of lubricant oil supplied to the first oil-supply channel 52 and the second oil-supply channel 54 is adjustable.

At the beginning of rotation of the rotation shaft 15 or at low-speed rotation of the rotation shaft 15, the first valve 53 and the second valve 55 are each opened, and the pump 50 is operated to supply lubricant oil to the first oil groove 42 and the second oil groove 46 via the first oil-supply channel 52 and the second oil-supply channel 54. The amount of lubricant oil supplied to each oil groove 42, 46 may be adjusted by the opening degree of each valve 53, 55. On the other hand, when the rotation shaft 15 is rotating at a rated rotation speed, the first valve 53 and the second valve 55 are closed, and the pump 50 is stopped to shut off supply of lubricant oil to the first oil groove 42 and the second oil groove 46 via the first oil-supply channel 52 and the second oil-supply channel 54. At this time, since the first oil groove 42 and the second oil groove 46 are not in communication, the pressures of the oil grooves 42, 46 are maintained independently from each other.

As described above, the first oil-supply channel 40 communicating with the first oil groove 42 and the second oil-supply channel 44 communicating with the second oil groove 46 are provided as separate systems so as to be capable of maintaining pressures different from each other at least when the rotation shaft 15 rotates. In this way, it is possible to prevent the pressures of the first oil groove 42 and the second oil groove 46 disposed along different constant-pressure lines (the first and second constant-pressure lines) from being averaged when the rotation shaft 15 rotates at a rated rotation speed, and to maintain a good function as a hydrodynamic bearing.

Second Embodiment

Figure 8:
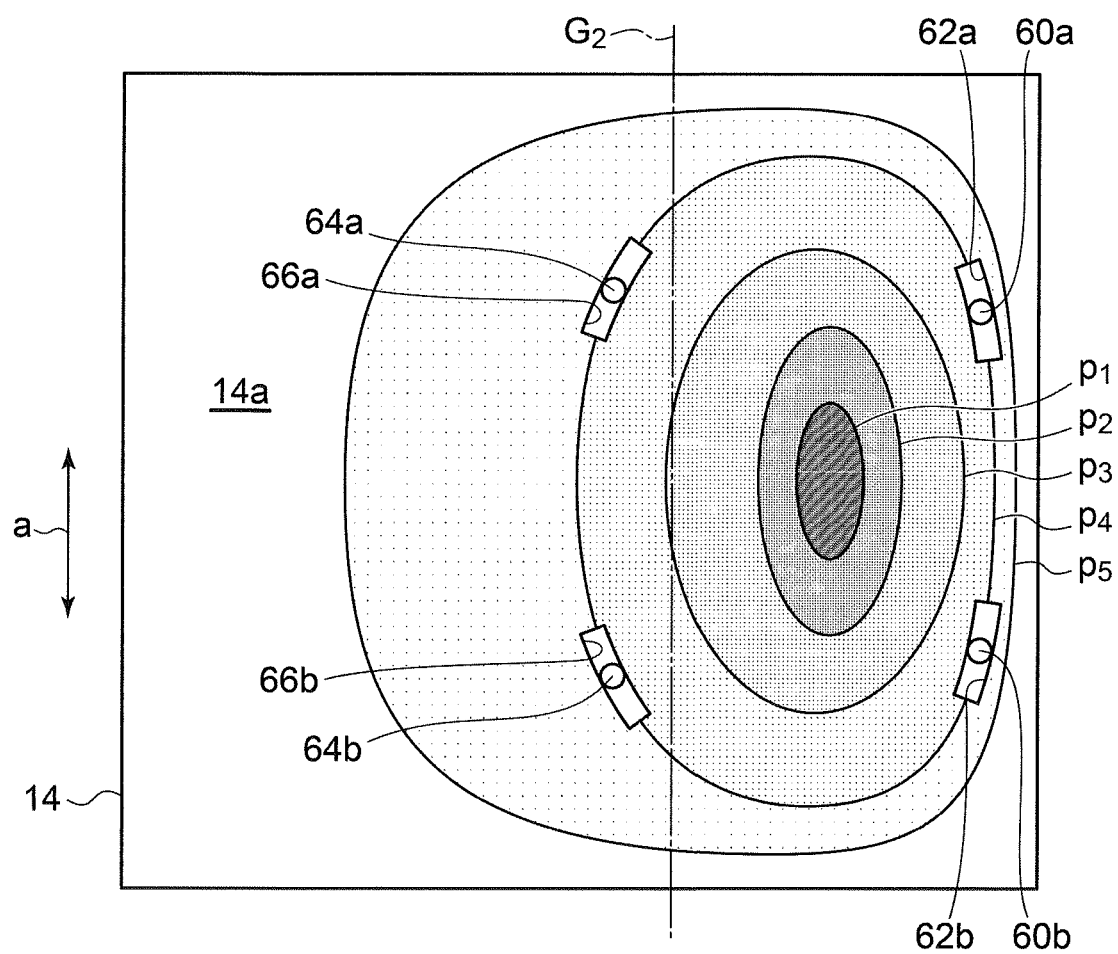
FIG. 8 is a developed view of a bearing surface according to the second embodiment of the present invention.
Figure 9:
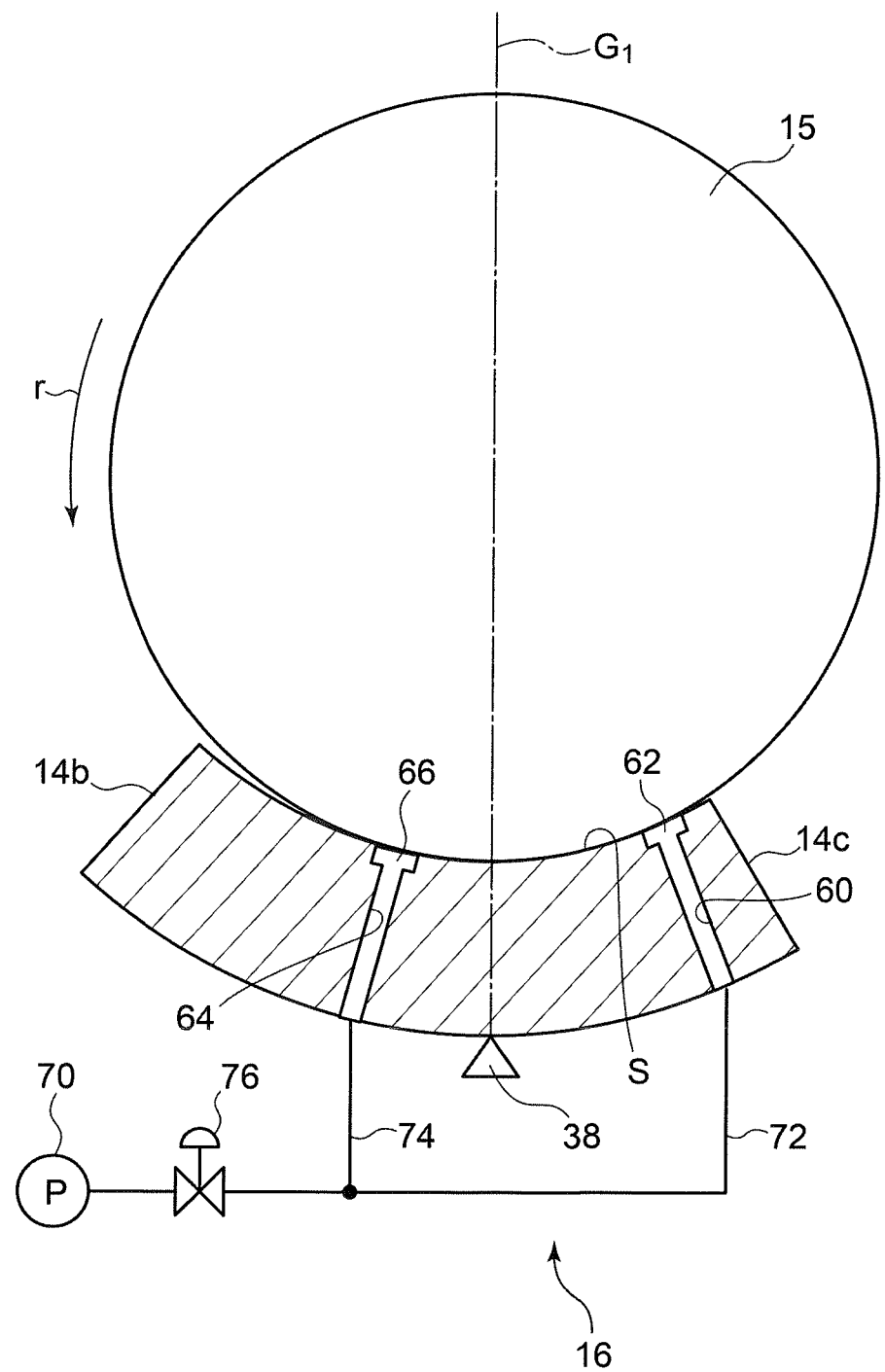
FIG. 9 is a configuration diagram of an example of an oil-supply mechanism of the bearing device according to the second embodiment of the present invention.

Next, the second embodiment of the present invention will be described with reference to FIGS. 8 and 9. FIG. 8 is a developed view of a bearing surface of a bearing pad according to the second embodiment of the present invention. FIG. 9 is a configuration diagram of an example of an oil-supply mechanism of the bearing device according to the second embodiment of the present invention.

The oil-supply mechanism 16 according to the present embodiment includes the first oil-supply inlets 60 (60*a*, 60), 64 (64as, 64b), the first oil grooves 62 (62a, 62b), 66 (66a, 66b), the first oil-supply channels 72, 74, and the first valve 76 and the pump 70.

A plurality of the first oil grooves 62, 66 is disposed along a constant-pressure line representing the same oil-film pressure. Further, the oil grooves 62, 66 are configured to communicate with each other via the first oil-supply channels 72, 74. For instance, the first oil-supply channels 72, 74 merge at the base side, and the first valve 76 is disposed between the pump 70 and the merged first oil-supply channels 72, 74. The first valve 76 is configured to adjust the amount of lubricant oil supplied to the first oil-supply channels 72, 74.

At the beginning of rotation of the rotation shaft 15 or at low-speed rotation of the rotation shaft 15, the first valve 76 is opened, and the pump 70 is operated so that lubricant oil is supplied to the first oil grooves 62, 66 via the first oil-supply channels 72, 74. On the other hand, when the rotation shaft 15 rotates at a rated rotation speed, the first valve 76 is closed, and the pump 70 is stopped so that supply of the lubricant oil to the first oil grooves 62, 66 via the first oil-supply channels 72, 74 is shut off.

According to the second embodiment, adopting a configuration in which the first oil-supply channels 72, 74 communicate with each other for the plurality of the first oil grooves 62, 66 disposed along the same constant-pressure line makes it possible to simplify the configuration of the oil-supply mechanism 16 such as the first oil-supply channels 72, 74 and the valve 73.

Third Embodiment

Figure 10:
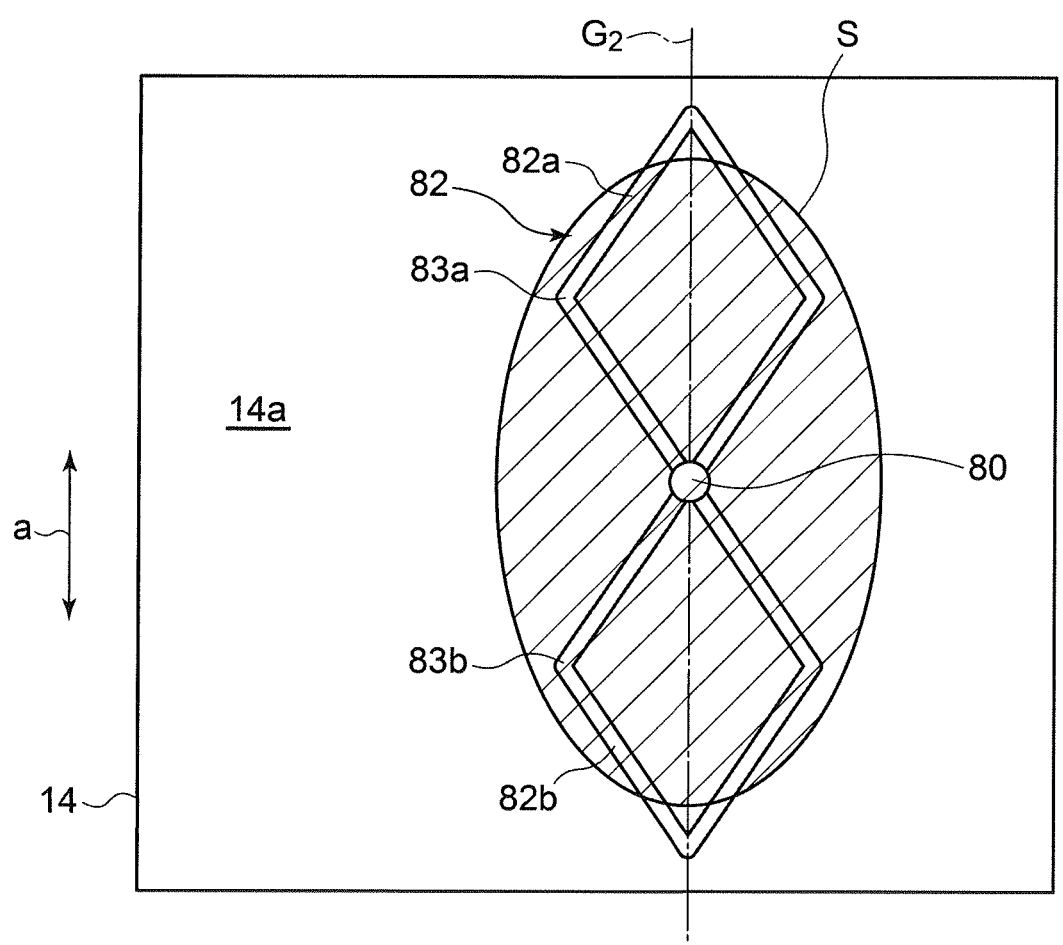
FIG. 10 is a developed view of a bearing surface according to the third embodiment of the present invention.

FIG. 10 is a developed view of a bearing surface of a bearing pad according to the third embodiment of the present invention.

As illustrated in FIG. 10, in one embodiment, the oil groove 82 may include a pair of rhombus-shaped oil grooves 82a, 82b disposed so as to sandwich the oil-supply inlet 80 along the axial direction of the rotation shaft 15. In this case, the oil groove 82 may be disposed over the straight line $G_2$ passing through the pivot 38, and the vertex parts 83a, 83b at the upstream side in the rotational direction in the circumferential direction of the rhombus shape of the oil groove 80 may be disposed at the upstream side in the rotational direction as compared to the straight line $G_2$. In the embodiment illustrated in FIG. 10, the oil groove 82 has a shape symmetric with respect to the straight line $G_2$.

Fourth Embodiment

Figure 11:
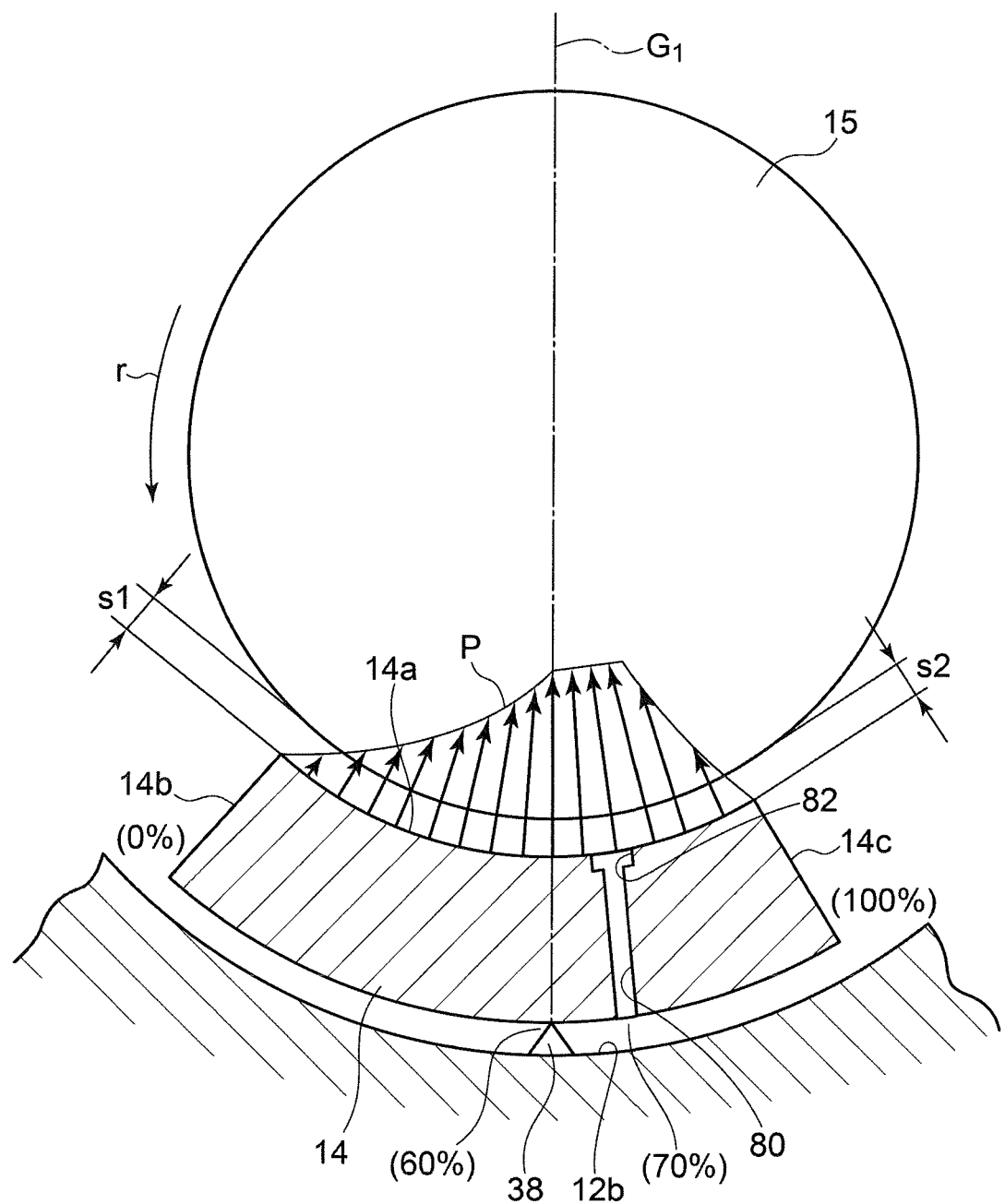
FIG. 11 is a cross-sectional view of a bearing device according to the fourth embodiment of the present invention.
Figure 12:
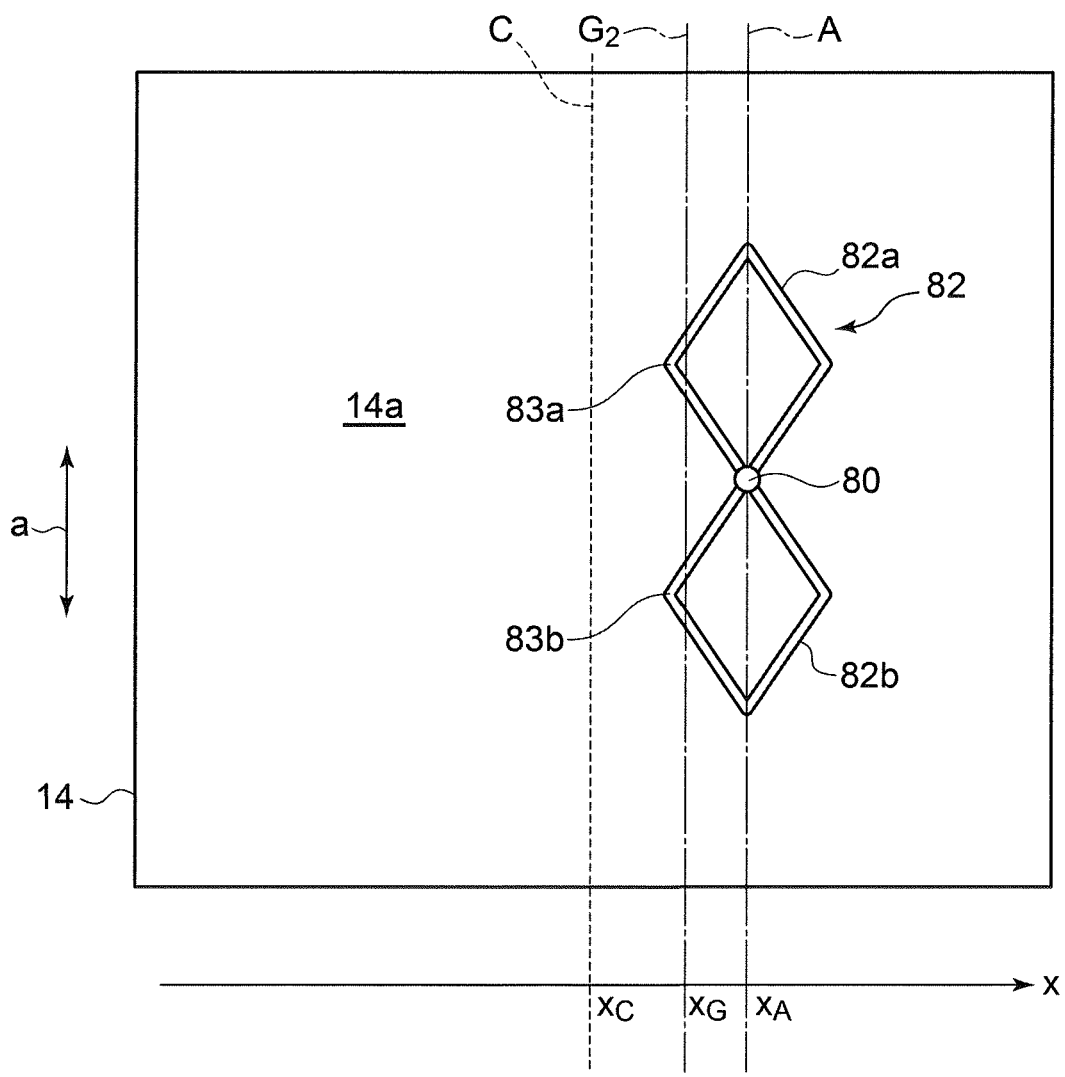
FIG. 12 is a developed view of a bearing surface of the bearing pad according to the fourth embodiment of the present invention.
Figure 13:
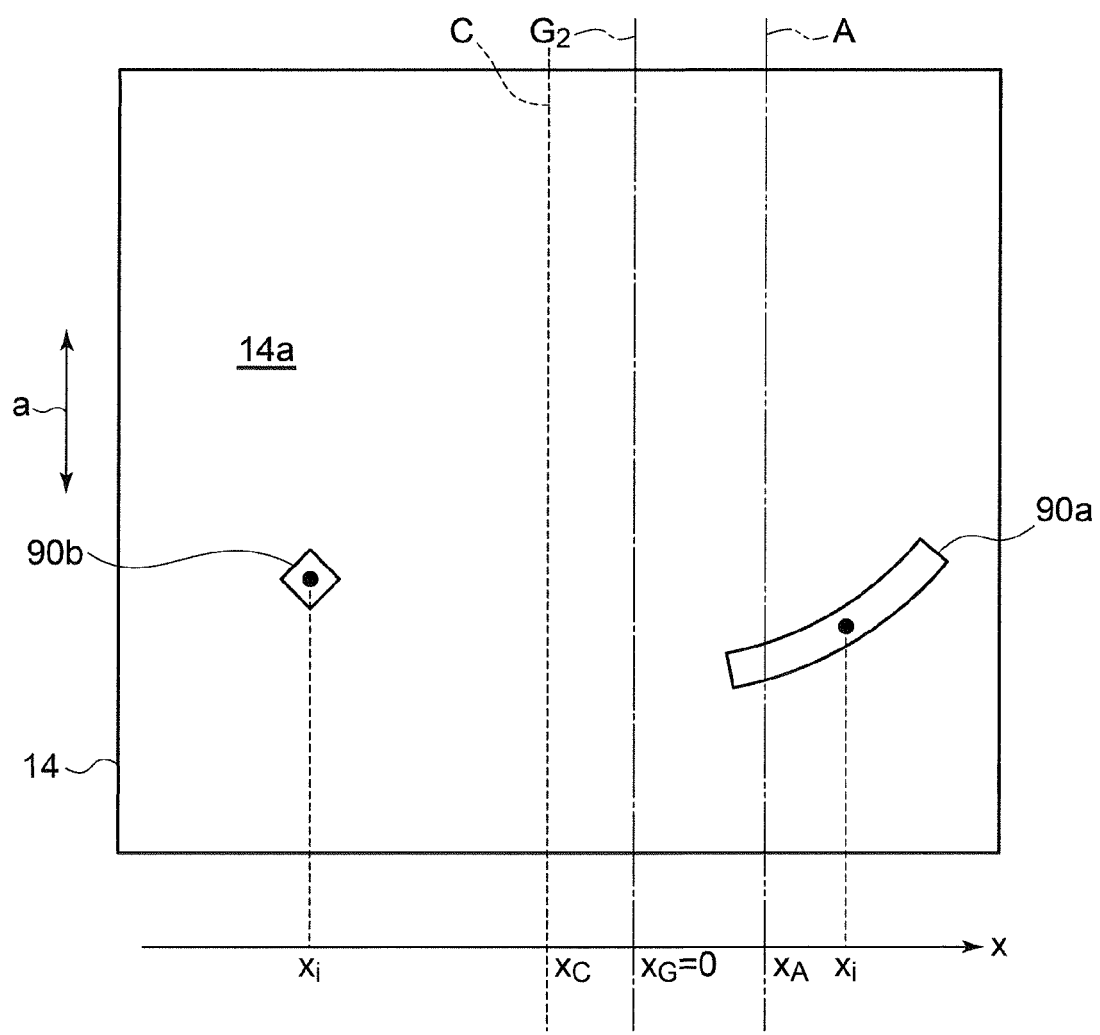
FIG. 13 is a diagram for describing a weighted mean position of an oil groove.

FIG. 11 is a cross-sectional view of a bearing pad according to the fourth embodiment of the present invention. FIG. 12 is a developed view of a bearing surface according to the fourth embodiment of the present invention. FIG. 13 is a diagram for describing a weighted mean position of an oil groove. Here, FIG. 12 is a planar developed view of a bearing pad 14 having a curvature.

In FIG. 11, $G_1$ is a straight line passing through the center of the rotation shaft 15 and the support point of the pivot 38. In FIG. 12, C is a straight line passing through the middle position of the bearing pad (bearing surface 14a) in the rotational direction of the rotation shaft 15. The middle position C is parallel to the axis of the rotation shaft 15. $G_2$ is a straight line passing through the support point of the bearing pad 14 supported by the pivot 38, extending in parallel to the axis of the rotation shaft 15. The arrow "a" represents the axial direction of the rotation shaft 15. Further, in FIGS. 12 and 13, the rotational direction of the rotation shaft 15 is represented by x-axis, and the position of the straight line $G_2$ passing through the support point (the arranged position of the support member) of the pivot 38 is set to be $x_G=0$. Further, the downstream side of the straight line $G_2$ passing through the support point of the pivot 38 in the rotational direction (the right side in FIGS. 12 and 13) is referred to as positive, and the upstream side of the straight line $G_2$ in the rotational direction (the left side in FIGS. 12 and 13) is referred to as negative.

Each bearing pad 14 is supported so as to be pivotable by the pivot 38 disposed on the inner circumferential surface of the housing segment 12b. In some embodiments, the pivot 38 is disposed offset toward the upstream side or the downstream side in the rotational direction of the rotation shaft 15, from the middle position C of the bearing pad 14 in the rotational direction of the rotation shaft 15. In the embodiment illustrated in FIG. 12, the arrangement position of the pivot 38 (the support point of the bearing pad 14) is disposed offset toward the positive direction (the downstream side in the rotational direction) of x-axis with respect to the middle position C of the bearing pad 14. For instance, as illustrated in FIG. 1, given that the leading edge 14b in the rotational direction is 0% and the trailing edge 14c in the rotational direction is 100%, the pivot 38 is disposed at a position of 60%, for instance.

An oil-supply inlet 80 is disposed, and an oil groove 82 communicating with the oil-supply inlet 80 is engraved, on the bearing surface 14a of the bearing pad 14. The oil groove 82 includes a pair of rhombus-shaped oil grooves disposed on either side of the rotation shaft 15 of the oil-supply inlet 80, in the axial direction. The oil groove 82 is disposed so that the weighted mean position $X_A$ of the oil groove 82 is offset from the straight line $G_2$ passing through the arrangement position of the pivot 38, in an offset direction of the support point of the pivot 38 with reference to the middle position C of the bearing pad 14, which is a direction toward the downstream side in the rotational direction in the embodiment exemplarily illustrated in FIGS. 11 and 12. Here, the weighted mean position of the oil groove 82 is a value representing the mean of the middle position C of the oil groove 82 in the circumferential direction of the rotation shaft 15 weighted by an opening area of the oil groove 82, which will be described below in detail.

With reference to FIG. 13, the configuration of the oil groove will be described in detail. In FIG. 13, as an example, two oil grooves 90a and 90b having different opening areas are disposed on either side of the straight line $G_2$ passing through the support point of the pivot 38. The oil groove 90a is disposed on the downstream side of the straight line $G_2$ in the rotational direction of the rotation shaft 15 (the right side of the straight line $G_2$ in FIG. 13), while the oil groove 90b is disposed on the upstream side of the straight line $G_2$ in the rotational direction (the left side of the straight line $G_2$ in FIG. 13). Herein, the position of the straight line $G_2$ on the x-axis is regarded as the origin ($X_G=0$). Thus, the coordinate $X_1$ representing the center position of the oil groove 90a on the x-axis is positive ($X_1>0$), and the coordinate $X_2$ representing the center position of the oil groove 90b on the x-axis is negative ($X_2<0$).

In the present embodiment, the oil groove 90a and the oil groove 90b are configured such that the weighted mean position $X_A$ of the oil grooves 90a, 90b is offset from the straight line $G_2$ passing through the support point of the pivot 38 (the arrangement position of the pivot 38) in the offset direction of the support point of the pivot 38 with reference to the middle position C of the bearing pad 14. In the example illustrated in FIG. 13, the pivot 38 is disposed offset toward the downstream side, in the rotational direction, of the middle position C in the rotational direction of the rotation shaft 15, where the offset direction is along the rotational direction. In this case, the oil groove 90a and the oil groove 90b are each formed so that the weighted mean position A of the oil groove 90a and the oil groove 90b is offset toward the downstream side of the straight line $G_2$ passing through the support point of the pivot 38 in the rotational direction (so that a relationship $x_A > x_G$ is satisfied).

Although not illustrated, in another embodiment, the pivot 38 is disposed offset toward the upstream side, in the rotational direction, of the middle position C in the rotational direction of the rotation shaft 15. In this case, the oil groove 90a and the oil groove 90b are each formed so that the weighted mean position of the oil groove 90a and the oil groove 90b is offset toward the upstream side of the straight line $G_2$ passing through the support point of the pivot 38 in the rotational direction.

A moment about the support point of the bearing pad 14 supported by the pivot 38 is applied to the bearing pad 14 of the tilting-pad bearing device 10, in accordance with the distribution of the oil-film pressure (see FIG. 11) formed between the rotation shaft 15 and the bearing pad 14 during operation of the JOP mechanism (i.e., while the lubricant oil is supplied) at the beginning of rotation of the rotation shaft 15 or at low-speed rotation of the rotation shaft 15. This moment is obtained by adding up local moments of all positions on the bearing surface 14a, each local moment being a product of the oil-film pressure at a certain position on the bearing surface 14a and a distance between the certain position and the support point. The local moments have opposite signs at either side of the support point of the bearing pad 14 supported by the pivot 38. Thus, the direction of the net moment corresponding to the distribution of the oil-film pressure formed between the rotation shaft 15 and the bearing pad 14 is determined depending on the magnitude relationship of the absolute value of the moment at either side of the support point of the bearing pad 14 supported by the pivot 38. Here, the contribution of each oil groove 90a, 90b to the local moment is represented by a product $x_i S_i$ of the center position $x_i$ (i=1, 2) of each oil groove 90a, 90b and the opening area $S_i$ (i=1, 2) of each oil groove 90a, 90b affecting the magnitude of the oil-film pressure formed by each oil groove 90a, 90b. Thus, the direction of the net moment corresponding to the distribution of the oil-film pressure is basically determined by the sum $\Sigma x_i S_i$ (i=1, 2) of contribution to the local moment in each oil groove 90a, 90b. In other words, the direction of the net moment corresponding to the distribution of the oil-film pressure is determined depending on the arrangement relationship between the position of the pivot 38 and a value obtained by dividing the sum $\Sigma x_i S_i$ by the sum $\Sigma S_i$ of the opening areas of all oil grooves. The value here is the weighted mean position $x_A$ of the oil grooves representing a mean position of the center positions $x_i$ of the respective oil grooves weighted by the opening areas $S_i$ of the oil grooves 90a, 90b.

In the above tilting-pad bearing device 10, the weighted mean position $X_A$ of the oil grooves 90a, 90b representing the mean position of the center positions $x_i$ of the respective oil grooves 90a, 90b weighted by the opening areas $S_i$ of the oil grooves is offset in an offset direction of the pivot 38 from the arrangement position of the pivot 38. Thus, even if the pivot 38 is offset from the middle position $x_c$ of the bearing pad 14, it is possible to balance the moment applied to the upstream side and the downstream side of the rotation shaft 15 in the rotational direction with reference to the pivot 38. In this way, it is possible to restrict inclination of the rotation shaft 15, and to prevent the rotation shaft 15 from contacting the bearing pad 14, at the beginning of rotation of the rotation shaft 15 or at low-speed rotation of the rotation shaft 15. Thus, it is possible to rotate the rotation shaft 15 smoothly. While two oil grooves 90a, 90b are disposed on the bearing surface 14a in the example illustrated in FIG. 13, the number, shape, arrangement configuration and the like of the oil grooves are not limited.

According to the above embodiment, it is possible to balance the moment applied to the upstream side and the downstream side of the rotation shaft in the rotational direction with reference to the pivot 38, with the weighted mean position of the oil grooves being offset from the arrangement direction of the pivot 38 in the offset direction based on the middle position of the pivot 38. In this way, it is possible to restrict inclination of the rotation shaft, and to prevent the rotation shaft from contacting the bearing pad at the beginning of rotation of the rotation shaft or at low-speed rotation of the rotation shaft. Thus, it is possible to rotate the rotation shaft smoothly.

In one embodiment, a gap s1 may be formed between the outer circumferential surface of the rotation shaft 15 and the leading edge 14b of the bearing pad 14 in the rotational direction, and a gap s2 may be formed between the outer circumferential surface of the rotation shaft 15 and the trailing edge 14c of the bearing pad 14 in the rotational direction, so that the total moment about the pivot in the hydraulic distribution P due to JOP formed on the bearing surface 14a is balanced between the upstream side and the downstream side of the pivot 38 in the rotational direction (direction "r" in the drawing) across the position of the pivot 38.

The positions of the oil-supply inlet 80 and the oil groove 82 may be disposed in a region at the further downstream side of the pivot 38 in the rotational direction, where the gap s1 becomes equivalent to the gap s2 when the total moment about the pivot in the hydraulic distribution P due to JOP is balanced between the upstream region and the downstream region of the pivot 38 in the rotational direction. The oil-supply inlet 80 is disposed at the 70% position, for instance.

As described above, with the oil-supply inlet 80 and the oil groove 82 disposed in a downstream region of the pivot 38 in the rotational direction, it is possible to secure a thickness of the oil film in the downstream region in the rotational direction. Further, with the oil-supply inlet 80 and the oil groove 82 disposed in a region where the gap s1 is equivalent to the gap s2, it is also possible to secure a thickness of the oil film in the upstream region in the rotational direction. In this way, it is also possible to maintain a uniform oil-film pressure over the entire region on the bearing surface 14a.

Fifth Embodiment

Figure 14:
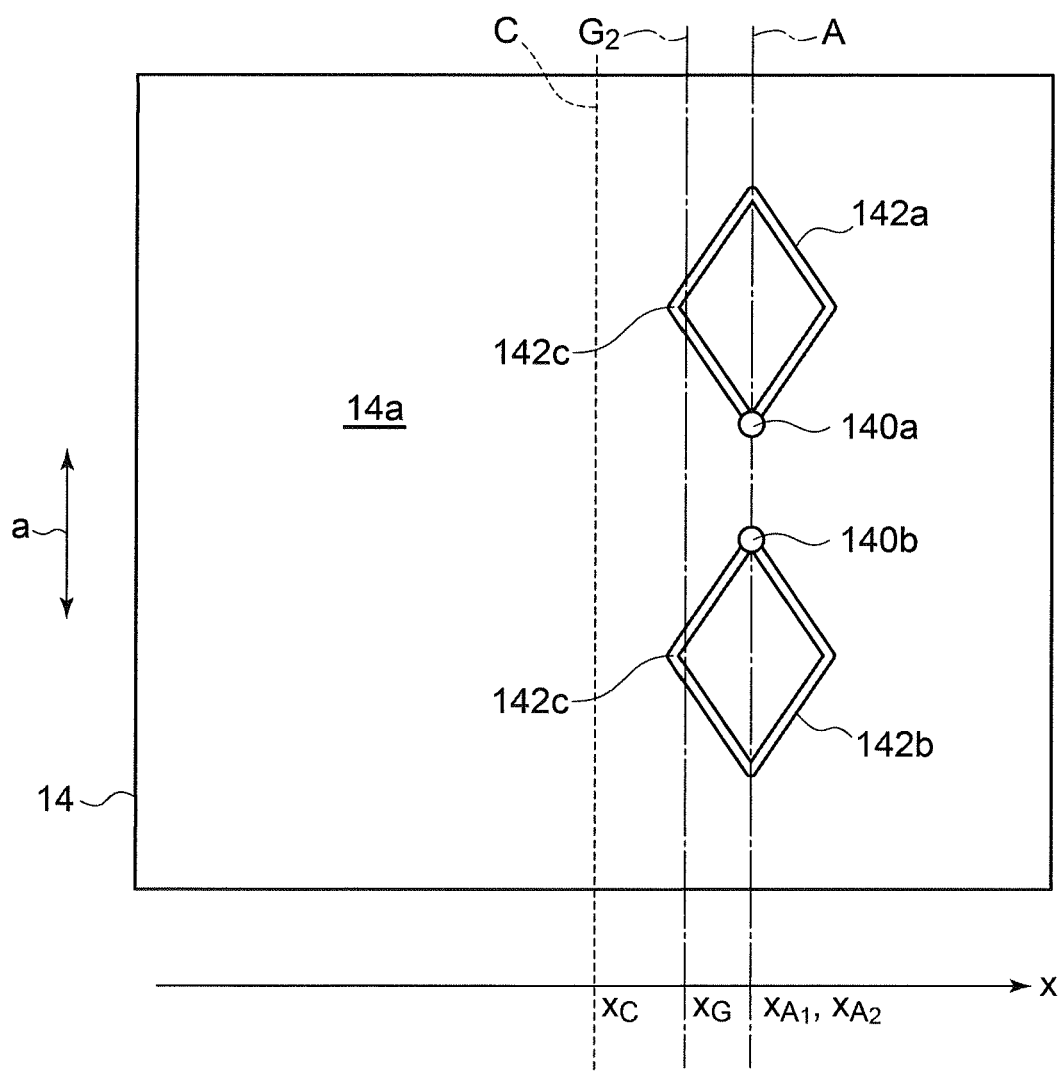
FIG. 14 is a developed view of a bearing surface of a bearing pad according to the fifth embodiment of the present invention.
Figure 15:
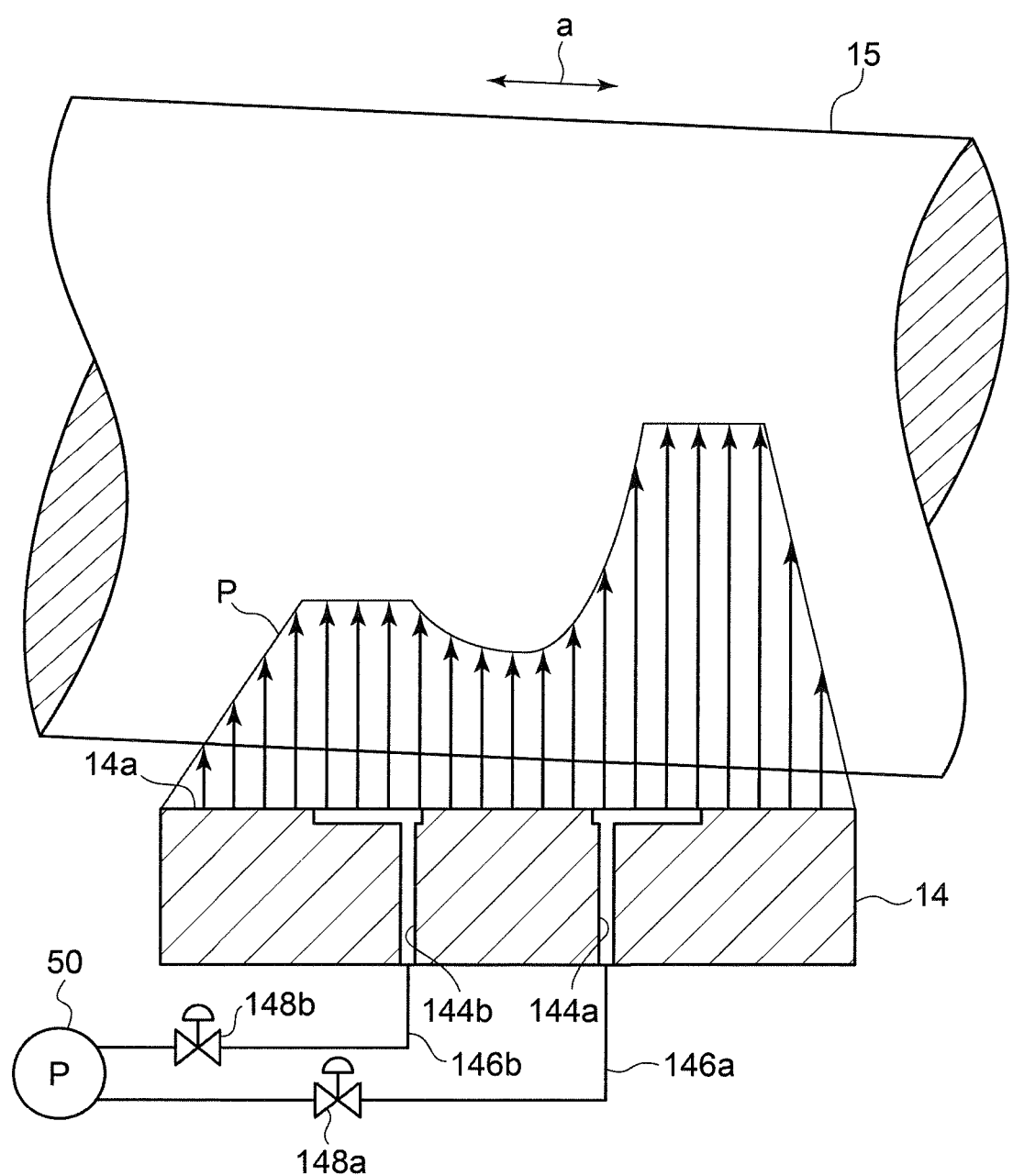
FIG. 15 is a diagram of pressure distribution of an oil film according to the fifth embodiment of the present invention.

Next, the fifth embodiment of the present invention will be described with reference to FIGS. 14 and 15. FIG. 14 is a developed view of a bearing surface of a bearing pad according to the fifth embodiment of the present invention. FIG. 15 is a diagram of pressure distribution of an oil film according to the fifth embodiment of the present invention.

As illustrated in FIG. 14, in the present embodiment, a plurality of oil-supply inlets 140a and 140b is disposed on the bearing pad 14. The oil-supply inlets 140a and 140b respectively communicate with the oil grooves 142a and 142*b*. The oil-supply inlet 140*a* is connected to a pump 50 which supplies high-pressure lubricant oil to the oil-supply inlets 140*a* and 140*b* via oil-supply channels 144*a* and 146*a* formed through the bearing pad 14. The oil-supply inlet 140*b* is connected to the pump 50 via oil-supply channels 144*b* and 146*b* formed through the bearing pad 14. A valve (flow-rate adjustment valves 148 and 148*b*) is disposed in each of the oil-supply channel 146*a* and 146*b*. The oil grooves 142*a* and 142*b* have a rhombus shape and formed independently from each other at positions separated in the axial direction (direction of arrow "a").

Here, the oil grooves 142*a*, 142*b* may be disposed so as to cross over the straight line $G_2$ in FIG. 14, and the vertex positions 142*c* of the rhombus shape of the oil grooves 142*a*, 142*b* at the upstream side in the circumferential rotational direction may be disposed at the upstream side of the straight line $G_2$ in the rotational direction (the left side in FIG. 14).

Further, the positional relationship between the pivot and the oil grooves 142*a*, 142*b* may be similar to the above fourth embodiment. Specifically, in one embodiment, the arrangement position $G_2$ of the pivot is offset from the middle position C of the bearing pad 14 with respect to the rotational direction x of the rotation shaft 15. The two oil grooves 142*a*, 142*b* are each disposed so that the weighted mean position $X_A$ of the two oil grooves 142*a*, 142*b* is offset in the offset direction from the arrangement position C of the pivot. In the example of FIG. 14, the offset direction is a direction toward the downstream side of the rotation shaft 15 in the rotational direction (the right side in FIG. 5).

The oil-supply mechanism is configured to supply lubricant oil to the oil-supply inlets 140*a*, 140*b* via the oil-supply channels 146*a*, 146*b* and the oil-supply channels 144*a*, 144*b* from the pump 50. At this time, it is possible to adjust the pressures of lubricant oil "o" flowing through the oil-supply channels 146*a*, 146*b* individually with the respective valves 148*a*, 148*b*. According to the present embodiment, in addition to the advantageous effect achieved by the fourth embodiment, if there is partial contact in the axial direction of the rotation shaft 15, it is possible to eliminate the partial contact by increasing the amount of lubricant oil supplied to the oil groove in a region with the partial contact and increasing the oil-film pressure.

Sixth Embodiment

Figure 16:
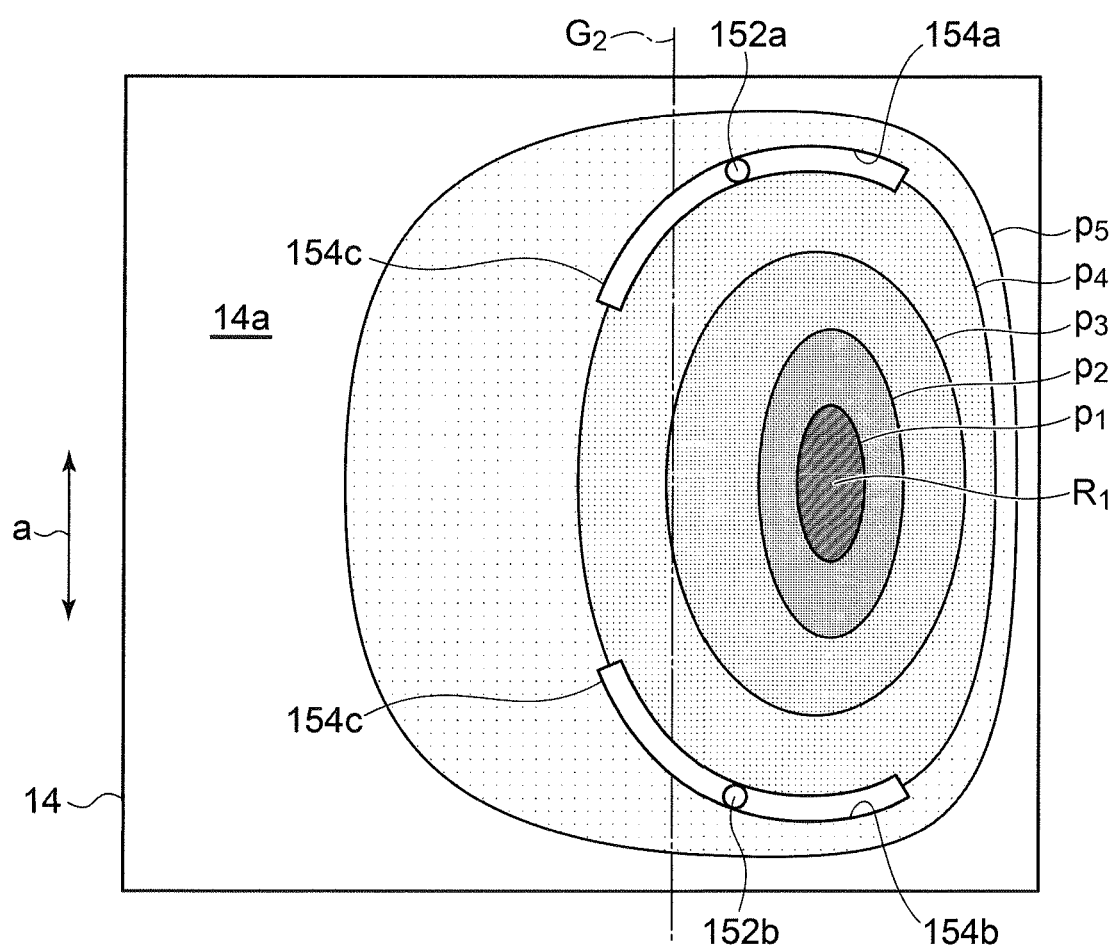
FIG. 16 is a developed view of a bearing surface of a bearing pad according to the sixth embodiment of the present invention.

Next, the sixth embodiment of the present invention will be described with reference to FIGS. 16 and 17. FIG. 16 is a developed view of a bearing surface of a bearing pad according to the sixth embodiment of the present invention. FIG. 17A is a diagram of pressure distribution of an oil film in the oil groove according to the fourth embodiment, and FIG. 17B is a diagram of pressure distribution of an oil film in the oil groove according to the sixth embodiment.

When the rotation shaft 15 is rotating at a high speed, supply of the lubricant oil to the oil-supply inlet disposed on the bearing surface 14*a* of the bearing pad 14 is stopped. At this time, the lubricant oil forms an oil-film pressure while rotating along with the rotation shaft 15, so as to form the distribution of the oil-film pressure illustrated in FIG. 16. The distribution of the oil-film pressure illustrated in FIG. 16 is similar to that described with reference to FIG. 3. Specifically, in FIG. 16, the lines p1 to p5 are constant-pressure lines of a wedge-shaped oil film formed from rotation of the shaft, where the inner region of p1 represents the maximum oil-film pressure, and the oil-film pressure decreases in sequence toward the outer side. As illustrated in the drawing, the distribution has an ellipse shape in which the constant pressure regions expand in a concentric fashion from the maximum oil-film pressure region $R_1$ at the center. Here, a constant-pressure line is a line connecting the positions having the same pressure of the oil film formed between the bearing surface 14*a* and the outer circumferential surface of the rotation shaft 15 when the rotation shaft 15 rotates.

In the present embodiment, each of the oil-supply inlets 152*a* and 152*b* is disposed on the constant-pressure line p4. Further, the oil groove 154*a* communicating with the oil-supply inlet 152*a* is disposed along the constant-pressure line p4, and similarly, the oil groove 154*b* communicating with the oil-supply inlet 152*b* is disposed along the constant-pressure line p4. The oil groove 154*a* and the oil groove 154*b* are independent from each other.

Each oil groove 154*a*, 154*b* is formed by a single communicating space. Thus, the pressure is the same at any position in each of the oil grooves 154*a*, 154*b*. Accordingly, if the oil grooves 42, 44 were formed so as to cross a constant-pressure line, the pressures in the respective oil grooves 154*a*, 154*b* could be averaged upon rotation of the rotation shaft 15, hindering the function as a hydrodynamic bearing.

In view of this, as in the above embodiment, each oil groove 154*a*, 154*b* is disposed along a constant pressure line, which makes it possible to maintain the pressures inside the oil grooves 154*a*, 154*b* at the respective constant-pressure line positions, and to maintain a good function as a hydrodynamic bearing.

Since the oil-film pressure is maintained to be constant in the entire region of each of the oil groove 154*a* or the oil groove 154*b*, the oil-film pressure does not decrease in the oil groove 154*a* or 154*b*.

This phenomenon will be described with reference to FIG. 17. FIG. 17A is a diagram illustrating the oil groove 82 of the fourth embodiment, and FIG. 17B is a diagram illustrating the oil groove 154*a* of the present embodiment. There is a risk that the rhombus-shaped oil groove 82 is disposed so as to cross constant-pressure lines having different oil-film pressures. Thus, as illustrated in FIG. 17A, the entire region of the oil groove 82 may have the oil-film pressure of the low pressure side, which may generate a low-pressure region Pr in the oil-film pressure distribution pa having a wedge shape due to rotation of the shaft. In contrast, the oil-film pressure is constant in the entire region of the oil groove 154*a* or 154*b* of the present embodiment. Thus, as illustrated in FIG. 17B, no low-pressure region is generated in the oil-film pressure distribution pb having a wedge shape due to rotation of the shaft.

Further, the oil groove 154*a* and 154*b* are arranged symmetrically in the axial direction with respect to the pivot 38. Thus, it is easy to form the same oil-film pressure in the axial direction of the rotation shaft 15. Thus, it is possible to restrict partial contact of the rotation shaft 15.

Here, the oil grooves 154*a* or 154*b* may be disposed so as to cross over the straight line $G_2$ in FIG. 16, and the oil-groove end portion 154*c* of the oil groove 154*a* or 154*b* at the upstream side in the rotational direction may be positioned at the upstream side of the straight line $G_2$ in the rotational direction.

Further, with the configuration of the oil-supply mechanism described with reference to the fifth embodiment, it is possible to prevent partial contact of the rotation shaft 15 by adjusting the supply pressure of the lubricant oil to the oil-supply inlets 152*a*, 152*b* independently.

Further, as described in the fourth and fifth embodiments, the weighted mean position $x_A$ of the oil grooves 154*a* and 154*b* with respect to the rotational direction of the rotation shaft 15 may be disposed so as to be offset from the straight line G₂ passing through the arrangement position of the pivot in the offset direction of the pivot with reference to the middle position of the bearing pad 14, which is a direction toward the downstream side in the rotational direction in the embodiment illustrated in FIG. 16.

Further, the position of the oil grooves 154a and 154b with respect to the rotational direction of the rotation shaft 15 may be in a region such that the gap s1 and the gap s2 (see FIG. 11) become equivalent when the total moment about the pivot in the oil-film pressure distribution P due to JOP is balanced between the upstream region and the downstream region of the pivot in the rotational direction.

Figure 18:
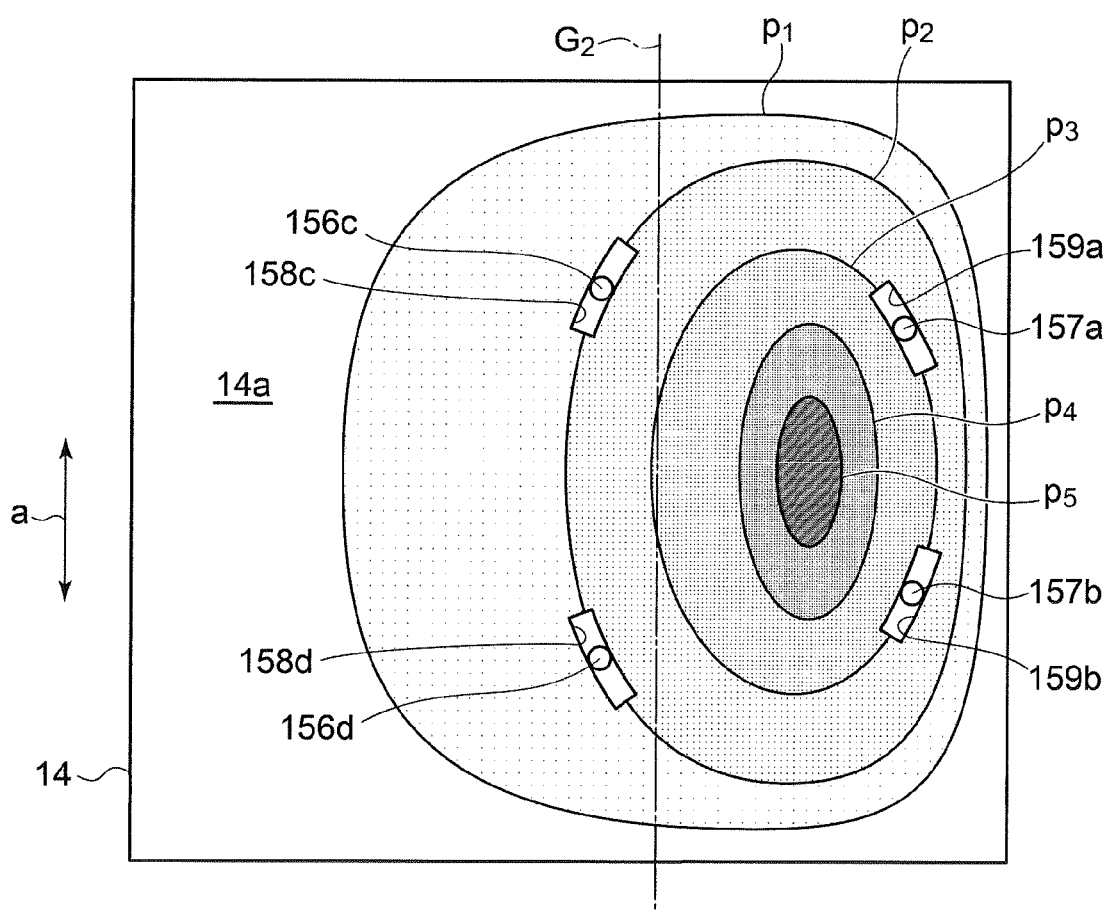
FIG. 18 is a developed view of a bearing surface of a bearing pad according to a modified example of the sixth embodiment.
Figure 19:
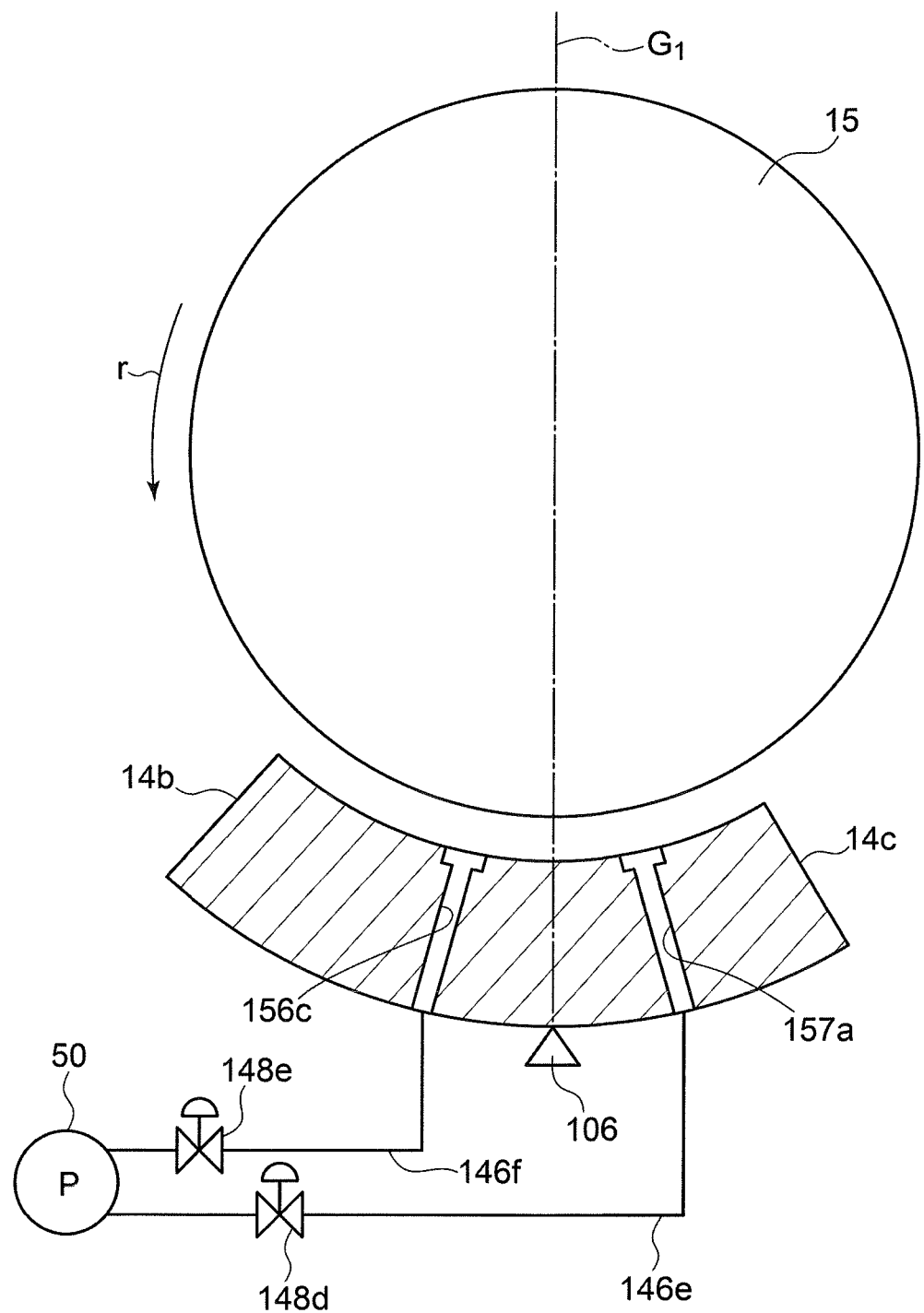
FIG. 19 is a cross-sectional view of a bearing device illustrating an oil-supply mechanism according to a modified example of the sixth embodiment.

Next, a modified example of the above sixth embodiment will be described with reference to FIGS. 18 and 19. FIG. 18 is a developed view of a bearing surface of a bearing pad according to a modified example of the sixth embodiment. FIG. 19 is a cross-sectional view of a bearing device for illustrating an oil-supply mechanism according to a modified example of the sixth embodiment.

The oil-supply mechanism illustrated in FIGS. 18 and 19 include the first oil-supply inlets 156c, 156d, the first oil grooves 158c, 158d, the second oil-supply inlets 157a, 157b, the second oil grooves 159a, 159b, the first oil-supply channel 146f, the second oil-supply channel 146e, the first valve 148e, the second valve 148d, and the pump 50.

The first oil grooves 158c, 158d and the second oil grooves 159a, 159b are disposed along constant-pressure lines representing different oil-film pressures. The first oil channel 146f and the second oil channel 146e are provided as separate systems so as to be capable of maintaining pressures different from one another, at least when the rotation shaft 15 is rotating. The first oil channel 146f and the second oil channel 146e are connected to the pump 50, so that the lubricant oil is supplied by the pump 50. The first valve 148e is disposed between the first oil channel 146f and the pump 50, while the second valve 148d is disposed between the second oil channel 146e and the pump 50, so as to be capable of adjusting the amount of lubricant oil supplied to the first oil channel 146f and the second oil channel 146e, respectively.

At the beginning of rotation of the rotation shaft 15 or at low-speed rotation of the rotation shaft 15, the first valve 148e and the second valve 148d are opened and the pump 50 is operated, so as to supply the lubricant oil to the first oil groove 158c (158d) and the second oil groove 159a (159b) via the first oil channel 146f and the second oil channel 146e. The amount of lubricant oil supplied to each oil groove 158c, 159a may be adjusted by the opening degree of each valve 148e, 148d. On the other hand, when the rotation shaft 15 rotates at a rated rotation speed, the first valve 148e and the second valve 148d are closed and the pump 50 is stopped so as to shut off supply of the lubricant oil to the first oil groove 158c (158d) and the second oil groove 159a (159d) via the first oil channel 146f and the second oil channel 146e. At this time, the first oil groove 158c (158d) and the second oil groove 159a (159b) are not in communication with each other, and thus the pressures in the respective oil grooves 158c (158d), 159a (159b) are independently maintained.

As described above, with the first oil-supply channel 146e communicating with the first oil groove 157a and the second oil-supply channel 146f communicating with the second oil groove 146c provided as separate systems so as to be capable of maintain pressures different from each other at least when the rotation shaft 15 is rotating, is it possible to avoid the pressures in the first oil groove 157a and the second oil groove 156c disposed along different constant-pressure lines (the first and second constant-pressure lines) from being averaged when the rotation shaft 15 rotates at a rated rotation speed, which makes it possible to maintain a good function as a hydrodynamic bearing.

As described above, an object of the tilting-pad bearing device 10 according to at least some embodiments of the present invention is to enable the rotation shaft 15 to levitate with a low supply hydraulic pressure. The tilting-pad bearing device 10 includes a plurality of bearing pads 14 disposed around a rotation shaft 15 so as to support the rotation shaft 15 rotatably, a support member (pivot 38) interposed between the plurality of bearing pads 14 and a bearing housing 12 supporting the plurality of bearing pads 14, the support member supporting each of the plurality of bearing pads 14 pivotably, and an oil-supply mechanism configured to supply a lubricant oil to at least one oil groove (42, 46, 62, 66, 82) formed on a bearing surface 14a of at least one of the plurality of bearing pads 14. The at least one oil groove (42, 46, 62, 66, 82) is disposed inside and outside a contact area S of the bearing surface 14a which is in contact with an outer circumferential surface of the rotation shaft 15 when the rotation shaft 15 is stopped.

Further, an object of the tilting-pad bearing device 10 according to at least some other embodiments of the present invention is to prevent contact between the rotation shaft 15 and the bearing pad 14. The tilting-pad bearing device 10 includes a plurality of bearing pads 14 disposed around a rotation shaft 15 so as to support the rotation shaft 15 rotatably, a support member (pivot 38) interposed between the plurality of bearing pads 14 and a bearing housing 12 supporting the plurality of bearing pads 14, the support member supporting each of the plurality of bearing pads 14 pivotably, and an oil-supply mechanism configured to supply a lubricant oil to at least one oil groove 82 formed on a bearing surface 14a of at least one of the plurality of bearing pads 14.

The support member (pivot 38) is disposed so as to be offset from a middle position C of the at least one bearing pad 14 in a rotational direction of the rotation shaft 15, toward an upstream side or a downstream side in the rotational direction of the rotation shaft 15.

A weighted mean position $x_A$ of the at least one oil groove representing a mean position of a respective center position $x_i$ of the at least one oil groove 82 in a circumferential direction of the rotation shaft 15 weighted by a respective opening area of the at least one oil groove 82 is offset from an arrangement position $G_2$ of the support member (pivot 38), in an offset direction of the support member (pivot 38) based on the middle position C.

Embodiments of the present invention were described in detail above, but the present invention is not limited thereto, and various amendments and modifications may be implemented within a scope that does not depart from the present invention. For instance, some of the above first to sixth embodiments may be combined upon implementation.

DESCRIPTION OF REFERENCE NUMERAL

10 Tilting-pad bearing device
12 Bearing housing
12a, 12b Housing segment
14 Bearing pad
14a Bearing surface
15 Rotation shaft
16 Oil-supply mechanism
18 Pump
20 Motor 22 Oil-supply line
24 Relief valve
26 Tank
28a, 28b Branch channel
30a, 30b Valve
34 Oil-supply inlet
36 Oil groove
38 Pivot
40 (40a, 40b) First oil-supply inlet
42 (42a, 42b) First oil groove
44 (44a, 44b) Second oil-supply inlet
46 (46a, 46b) Second oil groove
50 Pump
P Distribution of oil-film pressure due to JOP
Pr Low pressure region
$R_1$ Maximum oil-film pressure region
o Lubricant oil
pa, pb Pressure distribution of a wedge-shaped oil film formed from rotation of the shaft
p1 to p5 Constant-pressure lines of a wedge-shaped oil film formed from rotation of the shaft
s1, s2 Gap
S Contact area

The invention claimed is:

1. A tilting-pad bearing device, comprising:
a plurality of bearing pads disposed around a rotation shaft so as to support the rotation shaft rotatably;
a support member interposed between the plurality of bearing pads and a bearing housing supporting the plurality of bearing pads, the support member supporting each of the plurality of bearing pads pivotably; and
an oil-supply mechanism configured to supply a lubricant oil to at least one oil groove formed on a bearing surface of at least one of the plurality of bearing pads,
wherein the at least one oil groove is disposed along a constant pressure line passing through positions having a same pressure of an oil film formed between the bearing surface and the outer circumferential surface of the rotation shaft when the rotation shaft is rotating.

2. The tilting-pad bearing device according to claim 1,
wherein the at least one oil groove comprises at least one first oil groove disposed along a first constant pressure line passing through positions where the pressure of the oil film is a first pressure, and at least one second oil groove disposed along a second constant pressure line passing through positions where the pressure of the oil film is a second pressure which is different from the first pressure,
wherein the oil-supply mechanism includes a first oil-supply channel communicating with the at least one first oil groove, and a second oil-supply channel communicating with the at least one second oil groove, and
wherein the first oil-supply channel and the second oil-supply channel are separate systems capable of maintaining pressures different from each other at least when the rotation shaft is rotating.

3. The tilting-pad bearing device according to claim 2,
wherein the at least one first oil groove disposed along the first constant pressure line comprises a plurality of first oil grooves communicating with each other via the first oil-supply channel.

4. The tilting-pad bearing device according to claim 2, further comprising:
a first valve for adjusting an amount of the lubricant oil supplied to the at least one first oil groove, the first valve being disposed in the first oil-supply channel; and
a second valve for adjusting an amount of the lubricant oil supplied to the at least one second oil groove, the second valve being disposed in the second oil-supply channel.

5. The tilting-pad bearing device according to claim 1,
wherein the support member is disposed so as to be offset from a middle position of the at least one bearing pad in a rotational direction of the rotation shaft, toward an upstream side or a downstream side in the rotational direction of the rotation shaft, and
wherein a weighted mean position of the at least one oil groove representing a mean position of a respective center position of the at least one oil groove in a circumferential direction of the rotation shaft weighted by a respective opening area of the at least one oil groove is offset from an arrangement position of the support member, in an offset direction of the support member based on the middle position.

6. The tilting-pad bearing device according to claim 5,
wherein the support member is disposed on the downstream side, in the rotational direction of the rotation shaft, of the middle position of the bearing pad in the circumferential direction of the rotation shaft, and
wherein the weighted mean position of the at least one oil groove is offset toward the downstream side in the rotational direction of the rotation shaft from the arrangement position of the support member.

7. The tilting-pad bearing device according to claim 1,
wherein a plurality of oil-supply inlets which is supplied with the lubricant oil from the oil-supply mechanism is disposed on the bearing surface so as to be arranged in a line in an axial direction of the rotation shaft, the at least one oil groove including oil grooves which are formed independently from one another and each of which is in communication with a corresponding one of the plurality of oil-supply inlets.

8. The tilting-pad bearing device according to claim 1,
wherein the at least one oil groove is disposed within a region in which an oil-film pressure due to a wedge-shaped oil film formed on the bearing surface when the rotation shaft is rotating is uniform.

9. The tilting-pad bearing device according to claim 1,
wherein, when the rotation shaft is rotating, a constant-pressure region in which an oil-film pressure due to a wedge-shaped oil film formed on the bearing surface is uniform is formed such that a maximum oil-film pressure region is at a center and a region having a gradually decreasing oil-film pressure spreads outwardly from the maximum oil-film pressure region in a concentric fashion, and
wherein the at least one oil groove is disposed along the constant pressure line.

10. The tilting-pad bearing device according to claim 1,
wherein a gap between the rotation shaft and an upstream end of the bearing pad in the rotational direction is distributed in a range equivalent to a gap between the rotation shaft and a downstream end of the bearing pad in the rotational direction, due to an oil-film pressure generated between the outer circumferential surface of the rotation shaft and the bearing surface when the rotation shaft is rotating.

11. A tilting-pad bearing device, comprising:
a plurality of bearing pads for supporting a rotation shaft rotatably; and
a support member interposed between the plurality of bearing pads and a bearing housing supporting the plurality of bearing pads, the support member supporting each of the plurality of bearing pads pivotably;

wherein the plurality of bearing pads includes at least one bearing pad which has at least one oil groove on a bearing surface of the at least one bearing pad, the at least one oil groove being configured to be supplied with a lubricant oil, and wherein the at least one oil groove is disposed along a constant pressure line passing through positions having a same pressure of an oil film formed between the bearing surface and the outer circumferential surface of the rotation shaft when the rotation shaft is rotating.

* * * * *